US010109908B2

(12) United States Patent
Youm et al.

(10) Patent No.: US 10,109,908 B2
(45) Date of Patent: Oct. 23, 2018

(54) ANTENNA MODULE AND ELECTRONIC DEVICES COMPRISING THE SAME

(71) Applicant: Samsung Electronics Co., Ltd., Suwon-si, Gyeonggi-do (KR)

(72) Inventors: Byeong Hwan Youm, Suwon-si (KR); Jong Kwon Ko, Suwon-si (KR); Hyung Jin Kim, Seoul (KR); Seung Hwan Kim, Seoul (KR); Kyung Bin Kim, Hwaseong-si (KR); Austin Kim, Seongnam-si (KR); Joon Ho Byun, Yongin-si (KR); Yu Ri Sin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 14/677,217

(22) Filed: Apr. 2, 2015

(65) Prior Publication Data

US 2015/0288055 A1    Oct. 8, 2015

(30) Foreign Application Priority Data

Apr. 4, 2014 (KR) .................. 10-2014-0040492
Apr. 7, 2014 (KR) .................. 10-2014-0041476

(51) Int. Cl.
*H01Q 1/24* (2006.01)
*H01Q 1/38* (2006.01)
(Continued)

(52) U.S. Cl.
CPC ............ *H01Q 1/243* (2013.01); *H01Q 1/38* (2013.01); *H01Q 1/40* (2013.01); *H01Q 5/371* (2015.01);
(Continued)

(58) Field of Classification Search
CPC .................. H01Q 1/243; H01Q 1/40
See application file for complete search history.

(56) References Cited

U.S. PATENT DOCUMENTS 8,711,041 B2    4/2014   Han et al.
2007/0241971 A1*  10/2007   Tsujimura ............ G06F 1/1616
                                                    343/702
(Continued)

FOREIGN PATENT DOCUMENTS

CN        102244991 A     11/2011
EP        2 284 947 A1     2/2011
(Continued)

OTHER PUBLICATIONS

Database WPI Week 200712 Thomson Scientific, London, GB; AN 2007-117231 XP002745711,—& KR 2006 0042351 A (EMW Antenna Co Ltd) May 12, 2006 (May 12, 2006) * abstract; figure 1 *.
(Continued)

*Primary Examiner* — Robert Karacsony
(74) *Attorney, Agent, or Firm* — Jefferson IP Law, LLP

(57) ABSTRACT

An antenna module and an electronic device are provided. The antenna module may include a first case including a case surface, wherein at least one antenna protection part is disposed on the first case, and wherein the at least one antenna projection part is formed to be distinguishable from the case surface, an antenna including a pattern, wherein at least a part of the pattern of the antenna is adjacently disposed to the antenna protection part.

16 Claims, 22 Drawing Sheets

(51) Int. Cl.
    *H01Q 5/371*     (2015.01)
    *H01Q 9/42*     (2006.01)
    *H01Q 1/40*     (2006.01)
    *B29C 45/00*     (2006.01)
    *B29C 45/14*     (2006.01)
    *B29L 31/34*     (2006.01)

(52) U.S. Cl.
    CPC ......... *H01Q 9/42* (2013.01); *B29C 45/14836* (2013.01); *B29C 2045/0049* (2013.01); *B29K 2995/0005* (2013.01); *B29L 2031/3456* (2013.01)

(56) References Cited

U.S. PATENT DOCUMENTS

| | | |
|---|---|---|
| 2010/0033400 A1 | 2/2010 | Chang et al. |
| 2010/0271265 A1 | 10/2010 | Sung et al. |
| 2011/0032153 A1 | 2/2011 | Hong et al. |
| 2011/0279002 A1 | 11/2011 | Han et al. |
| 2012/0038518 A1* | 2/2012 | Wu ........................ H01Q 1/243 343/702 |
| 2012/0168517 A1 | 7/2012 | Lee |
| 2012/0287559 A1* | 11/2012 | Park ........................ H01Q 1/243 361/679.01 |
| 2013/0321219 A1 | 12/2013 | Cho et al. |
| 2014/0132454 A1 | 5/2014 | Hong et al. |
| 2014/0191910 A1* | 7/2014 | Chung ................... H01Q 1/243 343/702 |
| 2014/0313085 A1 | 10/2014 | Sung et al. |

FOREIGN PATENT DOCUMENTS

| | | |
|---|---|---|
| EP | 2 386 401 A1 | 11/2011 |
| EP | 2 245 956 A1 | 3/2012 |
| EP | 2 472 669 A1 | 7/2012 |
| EP | 2 523 252 A1 | 11/2012 |
| JP | 2006-311518 A | 11/2006 |
| KR | 10-0932079 B1 | 12/2009 |
| KR | 10-0955510 B1 | 4/2010 |
| KR | 10-1058432 B1 | 8/2011 |
| KR | 10-1255240 B1 | 4/2013 |
| WO | 2008/082088 A1 | 7/2008 |
| WO | 2008/143452 A1 | 11/2008 |
| WO | 2013/034956 A1 | 3/2013 |

OTHER PUBLICATIONS

Database WPI Week 201372 Thomson Scientific, London, GB; AN 2013-T48285 XP002745712,—& CN 103 208 677 A (Dongguan Jinsheng Accurate CGMPGNENT C0) Jul. 17, 2013 (Jul. 17, 2013) * abstract; figure 4 *.
Database WPI Week 201103 Thomson Scientific, London, GB; AN 2010-Q50114 XP002745713,—& KR 2010 0125940 A (EMW Co Ltd) Dec. 1, 2010 (Dec. 1, 2010) * abstract; figures 7-10 *.
Chinese Office Action dated May 31, 2017, issued in the Chinese Application No. 201510159365.3.
Chinese Office Action dated Nov. 24, 2017, issued in the Chinese Application No. 201510159365.3.

* cited by examiner

ANTENNA MODULE AND ELECTRONIC DEVICES COMPRISING THE SAME

CROSS-REFERENCE TO RELATED APPLICATION(S)

This application claims the benefit under 35 U.S.C. § 119(a) of a Korean patent application filed on Apr. 4, 2014 in the Korean Intellectual Property Office and assigned Serial number 10-2014-0040492, and of a Korean patent application filed on Apr. 7, 2014 in the Korean Intellectual Property Office and assigned Serial number 10-2014-0041476, the entire disclosure of each of which is hereby incorporated by reference.

TECHNICAL FIELD

The present disclosure relates to protection and characteristic improvement of elements of antennas.

BACKGROUND

Recently, wireless communication technology has been developed for easily transferring and sharing various types of data such as sounds, images and pictures. With this development of wireless communication technology, the diversification of information and the speed of communication have also been improved.

Furthermore, in order to keep up with the recent trend of digital convergence, electronic devices such as smartphones and tablets have been developed to provide various functions. For example, services based on functions of communication technologies such as digital multimedia broadcasting, (DMB), global positioning system (GPS), Bluetooth (BT), radio frequency identification (RFID) and Wi-Fi may be provided. To provide such services, an electronic device may be provided with one or more antennas.

The thicknesses of electronic devices such as smartphones or tablets have been decreased, but the number of components of such devices has been increased to support various functions. A thin and complicated electronic device may give satisfaction and provide various functions to a user, but may deteriorate in terms of a radio wave transmitting/receiving environment.

For example, according to the related art, an antenna pattern may be disposed in an injection-molded article. However, the antenna pattern may be deformed due to a high-temperature and high-pressure environment of an electronic device manufacturing process or an external impact or external pressure that may occur while an electronic device is used by a user. Furthermore, a radiation characteristic of an antenna may be changed due to other electronic elements arranged around the antenna, and thus it may be necessary to change the antenna pattern. However, according to the related art, it is almost impossible to change the antenna pattern since the antenna is sealed after being disposed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an antenna module for preventing an antenna pattern from being damaged by disposing a pattern protection structure at the periphery of the antenna pattern, and an electronic device including the same.

Another aspect of the present disclosure is directed to providing an antenna module for providing a waterproofing/dustproofing function by closing at least one hole disposed in the antenna module, and an electronic device including the same.

Another aspect of the present disclosure is directed to providing an antenna module for easily modifying an antenna pattern by exposing an end of an antenna pattern in at least a portion of processes, and an electronic device including the same.

Another aspect of the present disclosure is directed to providing an antenna module for modifying an antenna pattern and improving an antenna characteristic by adopting a simple spring structure, and an electronic device including the same.

In accordance with an aspect of the present disclosure, an antenna module is provided. The antenna module includes a first case including a case surface, wherein at least one antenna protection part is disposed on the first case, and wherein the at least one antenna projection part is formed to be distinguishable from the case surface, and an antenna having a pattern, wherein at least a part of the pattern of the antenna is adjacently disposed to the antenna protection part.

In accordance with an aspect of the present disclosure, the antenna module may further include a second case covering the antenna protection part and the part of the pattern adjacently disposed to the antenna projection part.

In accordance with an aspect of the present disclosure, an electronic device is provided. The electronic device may include an antenna module including a first case including a case surface, wherein at least one antenna protection part is disposed on the first case, and wherein the at least one antenna projection part is formed to be distinguishable from the case surface, an antenna including a pattern, wherein at least a part of the pattern of the antenna is adjacently disposed to the antenna protection part, and a second case covering the antenna protection part and the part of the pattern adjacently disposed to the antenna projection part. Further, the electronic device may include a frame in which the antenna module is disposed.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
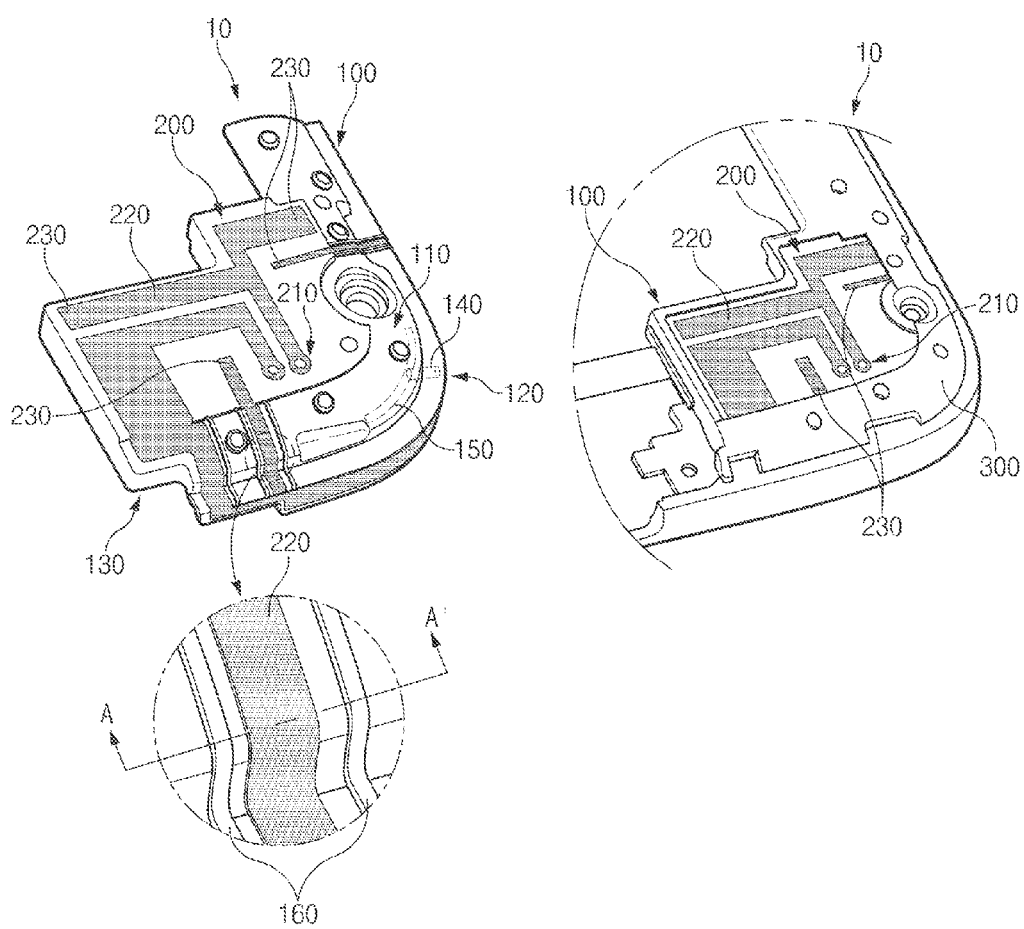
FIG. 1A illustrates a part of an antenna module according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "include," "comprise," "including," and/or "comprising" used herein indicates disclosed functions, operations, or existence of elements but do not exclude other functions, operations or elements. It should be further understood that the terms "include," "including," "comprise," "comprising," "have," and/or "having" used herein specify the presence of stated features, numbers, operations, elements, components, and/or combinations thereof but does not preclude the presence or addition of one or more other features, numbers, operations, elements, components, or combinations thereof.

The meaning of the terms "or" and/or "at least one of A and/or B" used herein include any and all combinations of words listed together with the term. For example, the expressions "A or B" and/or "at least one of A and/or B" may indicate A, B, or both A and B.

The terms such as "first," "second," and the like used herein may refer to various elements of various embodiments of the present disclosure, but do not limit the elements. For example, such terms do not limit the order and/or priority of the elements. Furthermore, such terms may be used to distinguish one element from another element. For example, a first user device and a second user device indicate different user devices. For example, without departing the scope of the present disclosure, a first element may be named as a second element, and similarly, a second element may be named as a first element.

It will be understood that when an element is referred to as being "connected" or "coupled" to another element, it can be directly connected or coupled to the other element or intervening elements may be present. In contrast, when an element is referred to as being "directly connected" or "directly coupled" to another element, it should be understood that there are no intervening elements. For example, in the case where an antenna radiator is connected to a circuit substrate for the purpose of feeding, the feeding may include both feeding through a direct connection and feeding through an indirect connection (e.g., coupling feeding). Furthermore, ground connection (or ground contact) includes both direct connection and indirect connection between a ground area and an antenna. In addition, antenna connection may include both direct connection (connection by physical contact) and indirect connection (coupling connection) between antennas arranged at different locations (e.g., antenna patterns or antenna radiators). That is, in the present disclosure, the term "connection" or an electrical configuration that may be construed as "connection" includes a direct connection or an indirection connection, and may be established electrically and does not need to be established physically, unless otherwise specified or the above-mentioned configuration is illogical or cannot be carried out by those skilled in the art.

The terminology used herein is not for delimiting the present disclosure but for describing specific various embodiments of the present disclosure. The terms of a singular form may include plural forms unless otherwise specified.

The terms used herein, including technical or scientific terms, have the same meanings as understood by those skilled in the art unless otherwise defined herein. The commonly used terms such as those defined in a dictionary should be interpreted in the same context as in the related art and should not be interpreted in an idealized or overly formal sense unless otherwise defined explicitly.

Electronic devices according to various embodiments of the present disclosure may include at least one antenna and a structure in which the antenna is disposed. For example, the electronic devices may include at least one of smartphones, tablet personal computers (PCs), mobile phones, video telephones, electronic book readers, desktop PCs, laptop PCs, netbook computers, personal digital assistants (PDAs), portable multimedia players (PMPs), MP3 players, mobile medical devices, cameras, or wearable devices (e.g., head-mounted-devices (HMDs) such as electronic glasses, electronic apparel, electronic bracelets, electronic necklaces, electronic appcessories, electronic tattoos, or smart watches).

According to various embodiments of the present disclosure, the electronic devices may be smart home appliances provided with at least one antenna and a structure in which the antenna is disposed. The smart home appliances may include at least one of, for example, televisions (TVs), digital video disk (DVD) players, audio players, refrigerators, air conditioners, cleaners, ovens, microwave ovens, washing machines, air cleaners, set-top boxes, TV boxes (e.g., Samsung HomeSync™, Apple TV™, or Google TV™), game consoles, electronic dictionaries, electronic keys, camcorders, and electronic picture frames.

According to various embodiments of the present disclosure, the electronic devices may include at least one of medical devices (e.g., magnetic resonance angiography (MRA), magnetic resonance imaging (MRI), computed tomography (CT), scanners, and ultrasonic devices), navigation devices, global positioning system (GPS) receivers, event data recorders (EDRs), flight data recorders (FDRs), vehicle infotainment devices, electronic equipment for ships (e.g., navigation systems and gyrocompasses), avionics, security devices, head units for vehicles, industrial or home robots, automatic teller's machines (ATMs), and points of sales (POSs).

According to various embodiments of the present disclosure, the electronic devices may include at least one of parts of furniture or buildings/structures, electronic boards, electronic signature receiving devices, projectors, or measuring instruments (e.g., water meters, electricity meters, gas meters, or wave meters) including at least one antenna and a structure in which the antenna is disposed. The electronic devices according to various embodiments of the present disclosure may be one or more combinations of the above-mentioned devices. Furthermore, the electronic devices according to various embodiments of the present disclosure may be flexible devices. It would be obvious to those skilled in the art that the electronic devices according to various embodiments of the present disclosure are not limited to the above-mentioned devices.

In various embodiments of the present disclosure, the term "case" may represent a part or the entirety of an exterior or interior of an electronic device. For example, a first case may be an inner structure of an electronic device of which a material enables disposition of an antenna through laser direct structuring (LSD). A second case may be prepared through an additional process other than a manufacturing process of the first case. The second case may be prepared based on the first case, or may be prepared independently from the first case and then may be joined to the first case. The electronic devices may include at least one of various cases such as a front cover, a rear cover, and a battery cover in addition to the first or second case. For example, at least a part of the first or second case mentioned in various embodiments of the present disclosure may be related to an antenna. At least a part of the first or second case may be formed of a metallic or nonmetallic material as necessary.

Hereinafter, an electronic device according to various embodiments of the present disclosure will be described with reference to the accompanying drawings. The term "user" used herein may refer to a person who uses an electronic device or may refer to a device (e.g., an artificial electronic device) that uses the electronic device.

Specifically, FIGS. 1A through 15, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1A illustrates a part of an antenna module according to an embodiment of the present disclosure.

Referring to FIG. 1A, an antenna module 10 is illustrated, where the antenna module 10 may include a case 100 (e.g., a first case), an antenna 200, and a case 300 (e.g., a second case).

The case 100 may be made of a material that enables an antenna pattern to be disposed in a designated manner. For example, the material of the case 100 may enable antenna disposition through LDS or antenna disposition through printing (e.g., dot printing, inkjet printing, or pad (e.g., a silicon pad) printing), double injection, Flexible printed circuit board (FPCB) structure, steel use stainless (SUS) structure, or metal ink painting.

According to an embodiment of the present disclosure, the case 100 that supports the LDS may be made of platable plastic obtained by mixing a nonmetallic material (e.g., plastic) with at least one metallic material (e.g., palladium) so as to allow antenna pattern plating or printing. According to various embodiments of the present disclosure, the case 100 may be a carrier in which the antenna 200 is disposed. The case 100 may be a frame in which a display or a battery of the electronic device is placed. Alternatively, the case 100 may be a substrate on which a printed circuit board is placed. FIG. 1A illustrates that the shape of the case 100 corresponds to that of a corner area of the electronic device, but various embodiments of the present disclosure are not limited thereto. For example, as mentioned above, the case 100 may be separately manufactured as a carrier in which the antenna 200 is disposed so as to be joined or attached to another case.

According to various embodiments of the present disclosure, the case 100 may be a part or the entirety of at least one of a front part 130, a rear part 110, or a side part 120 of the electronic device. Here, the front part 130, the rear part 110, and the side part 120 may be referred to thus on the assumption that an image output direction of a display is a front direction. Accordingly, the front part 130, the rear part 110, and the side part 120 may be changed according to a form of arrangement in the electronic device or observation thereon. According to an embodiment of the present disclosure, the case 100 may include a part of a corner area of the rear part 110 and a part of a corner area of the side part 120. Alternatively, the case 100 may include the side part 120 that includes a border (e.g., a rectangular border) of the electronic device and a part of a rear area disposed on the corner area of the side part 120. An antenna protection part 160 may be disposed on at least a part of the case 100.

The antenna protection part 160 may include at least one projection surrounding an area on which the antenna 200 is disposed or at least one rail extending from the projections. According to various embodiments of the present disclosure, the antenna protection part 160 may be raised from a surface of the case 100 by a certain distance. The antenna protection part 160 raised in the form of a rail may be provided in the form of a sidewall that protrudes from the surface of the case 100 by a certain distance. An upper end part of the sidewall may be rounded. According to various embodiments of the present disclosure, the antenna protection part 160 may be lowered from the surface of the case 100 by a certain distance. Alternatively, at least a part of the antenna protection part 160 may be raised (or may protrude or may be embossed) at an adjacent area to the area on which the antenna 200 is disposed and the other part of the antenna protection part 160 may be lowered (or engraved).

According to various embodiments of the present disclosure, the antenna protection part 160 may be formed through injection molding according to a mold pattern while the case 100 is manufactured. According to various embodiments of the present disclosure, when the injection molding is completed, the antenna protection part 160 may be additionally disposed (e.g., mounted or printed) on the surface of the case 100. The antenna protection part 160 may be made of the same material as that of or a different material from that of the case 100. According to an embodiment of the present disclosure, the antenna protection unit 160 may be made of a nonmetallic material (e.g., a plastic material). Alternatively, the antenna protection unit 160 may be made of the material of the case 100 which allows the application of the LDS. Alternatively, the antenna protection unit 160 may be a metal line disposed in the form of a rail at an adjacent area to the antenna 200 disposed on the case 100.

According to various embodiments of the present disclosure, the raised-type antenna protection part 160 may reduce an external pressure applied to the antenna 200, while an injection material covers the antenna 200 during a second injection molding process after the antenna 200 is disposed. For example, the case 100 printed or plated may be disposed in an additional mold chamber, and then may be injection-deformed in relation to manufacturing of the case 300.

An injection fluid introduced into the mold chamber may be disposed in the form of a mold while flowing on the surface of the case 100 in a high-temperature and high-pressure state. In this process, a speed and pressure of the injection fluid that flows on a surface of the antenna 200 may be decreased by the raised antenna protection part 160 disposed at the periphery of the antenna 200. Accordingly, the antenna protection part 160 may prevent or reduce damage to the antenna 200 caused by an injection molding process. Regarding the lowered-type antenna protection part 160, the injection fluid firstly fills the lowered antenna protection part 160 and flows on the surface of the antenna 200, so that the pressure applied to the antenna 200 may be reduced. In various embodiments below, it is assumed that the antenna protection part 160 is raised at an adjacent area to the antenna 200.

The antenna 200 may be disposed on at least a part of the case 100 in a designated form. For example, a manufacturing process of the antenna 200 may include a patterning process for forming a plating pattern (or a printing pattern) by laser-processing, based on a designated pattern, the surface of the case 100 to which the LDS is applied, and an arrangement process for forming the antenna 200 (or an antenna pattern or an antenna radiator) by plating with (or printing or depositing) a conductive material (e.g., a metallic material) on a pattern. A depth of the pattern of the patterning process may correspond to a thickness of the antenna 200 plated. The pattern having a certain depth may be plated with the antenna 200 so that the thickness of the antenna 200 may be equal or similar to the depth of the pattern. According to various embodiments of the present disclosure, the antenna 200 may include a contact connection part 210, a pattern part 220, and an end part 230.

According to various embodiments of the present disclosure, the contact connection part 210 may pass through the rear part 110 and the front part 130 of the case 100 or the inner and outer sides of the side part of the case 100 so as to electrically connect the rear and front parts or the inner and outer sides. For example, the contact connection part 210 may be provided as a through-hole. The contact connection part 210 may have the shape of a hole having different cross section shapes according to a depth thereof, in relation to support for laser processing. For example, the contact connection part 210 may be provided as a through-hole having a lozenge-shaped cross section, the area of which varies in a depth direction.

A conductive hole pattern may be disposed in the contact connection part 210. A terminal pattern electrically connected to the contact connection part 210 may be disposed on the back of the contact connection part 210. According to various embodiments of the present disclosure, the contact connection part 210 may be closed for the purpose of waterproofing/dust proofing. According to an embodiment of the present disclosure, the closed contact connection part 210 may be filled with an injection material of the case 300 or a conductive metal pin may be disposed in the closed contact connection part 210. According to various embodiments of the present disclosure, at least one antenna protection part 160 may be disposed at the periphery of the contact connection part 210 or at the periphery of the through-hole of the contact connection part 210.

The pattern part 220 may be disposed so as to connect the contact connection part 210 and the end part 230. A length, width or volume of the pattern part 220 may be determined according to an available frequency band of a communication module related to operation of the antenna 200. According to various embodiments of the present disclosure, the electronic device may operate a plurality of communication modules, and a plurality of contact connection parts 210 and end parts 230 may be provided accordingly. The pattern unit 220 may be provided in plurality to connect the contact connection parts 210 and the end parts 230. The pattern part 220 may be disposed on, for example, at least a part of the rear part 110 of the case 100 and at least a part of the side part 120 of the case 100. At least a part of the rear part 110 or side part 120 of the case 100 of the pattern part 220 may be exposed to the outside even after the case 300 is disposed.

According to an embodiment of the present disclosure, at least a part of the pattern part 220 disposed on the rear part 110 of the case 100 may be exposed to the outside. The antenna protection part 160 may be disposed on an adjacent area to an area of a part of the pattern part 220 covered by the case 300. The antenna protection part 160 may not be disposed on an area of the pattern part 220 exposed to the outside. According to an embodiment of the present disclosure, the pattern part 220 of the antenna 200 may be disposed on the side part 120 of the case 100. The antenna protection part 160 may be disposed in the form of a rib or a rail on the side part 120 of the case 100 at the periphery of the pattern part 220. Alternatively, a center portion of the side part 120 of the case 100 may be engraved. The pattern part 220 may be disposed on a bottom surface of the side part 120 engraved. The antenna protection part 160 may be both sidewalls of the engraved bottom surface of the side part 120. Alternatively, the antenna protection part 160 may be a stepped part formed on an edge of the side part 120. Alternatively, the antenna protection part 160 may be a rib disposed on an edge of the side part 120.

The end part 230 may be connected to the pattern part 220. The end part 230 may be a part of an end of the pattern part 220. The end part 230 may be disposed on at least one of the rear part 110, the side part 120 and the front part 130 of the case 100. According to an embodiment of the present disclosure, the end part 230 of the antenna 200 for covering a specific frequency band may be provided in plurality. At least one of the plurality of end parts 230 may be exposed to the outside after the case 300 is formed. The antenna protection part 160 may not be disposed on an area adjacent to the end part 230 exposed to the outside. A part of the end part 230 may be removed or extended in relation to control of a radiation characteristic of the antenna 200. According to an embodiment of the present disclosure, the pattern part 220 or the end part 230 disposed on the rear part 110 may be connected to a front pattern part 150 disposed on the front part 130 through a connection through-hole 140.

As described above, in an antenna module 10 according to various embodiments of the present disclosure, the antenna protection part 160 is provided to at least a part of the surface of the case 100 on which the antenna 200 is disposed so that the antenna 200 is prevented from being damaged or deformed while the case 300 is disposed. Furthermore, in the antenna module according to various embodiments of the present disclosure, the through-hole provided in the contact connection part 210 of the antenna 200 is sealed so that the effect of waterproofing/dust proofing is achieved. Moreover, in the antenna module 10, the end part 230 of the antenna 200 is exposed to the outside of the case 300 so that an operation related to compensation of the antenna 200 is facilitated. Here, the antenna module 10 supports removal or extension of the end part 230 using the LDS-type case 100 so that a length of the antenna 200 may be more easily adjusted.

According to various embodiments of the present disclosure, the antenna 200 may be disposed on the case 100 after being prepared in the form of a designated pattern. For example, the antenna 200 may be formed of a material such as phosphor bronze, SUS or an aluminum alloy, and then may be attached onto the case 100. Here, the antenna protection part 160 may be disposed at the periphery of the antenna 200 on the surface of the case 100.

Figure 1B:
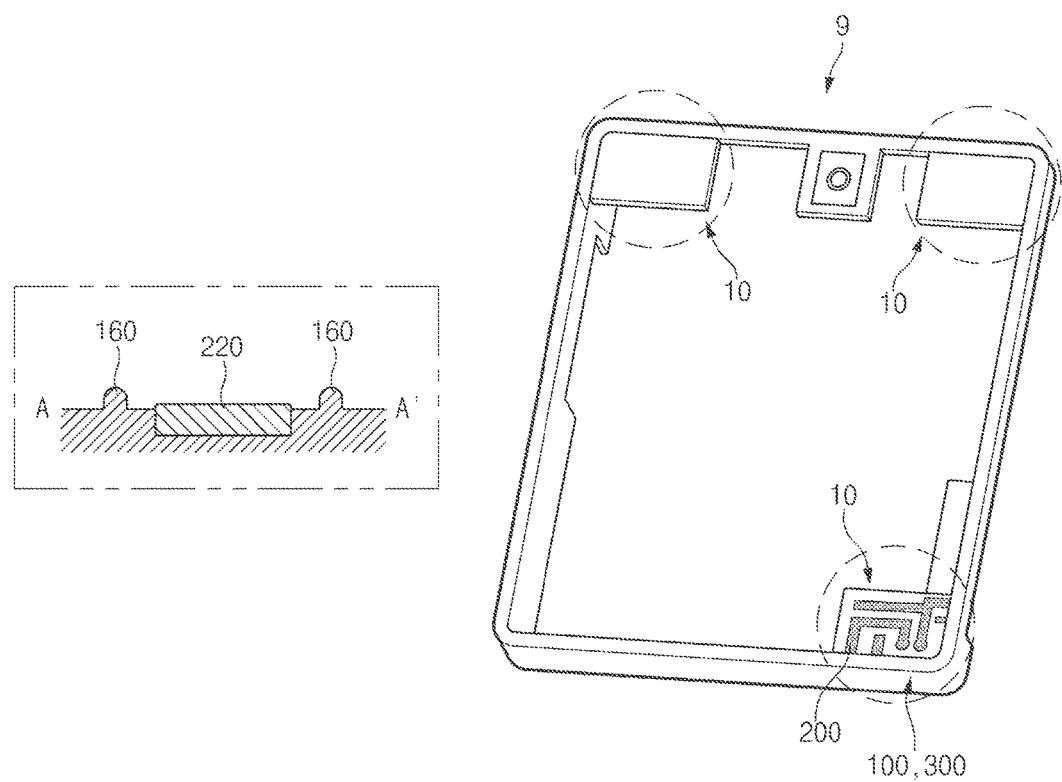
FIG. 1B illustrates a cross section of a part of a first case and a frame of an electronic device according to an embodiment of the present disclosure.

FIG. 1B illustrates a cross section of a part of a first case and a frame of an electronic device according to an embodiment of the present disclosure.

Referring to FIG. 1B, a frame 9 is illustrated, where the frame 9 may include at least one antenna module 10 including an antenna protection part 160 disposed on at least a part of a case 100 and/or a case 300 on which the antenna 200 is disposed.

For example, the antenna protection part 160 may be disposed in parallel with the antenna 200 to guide the antenna 200 including pattern part 220. The antenna module 10 may be disposed on, for example, at least a part of the frame 9 of the electronic device. For example, the antenna module 10 may be disposed in a corner area of the electronic device. According to various embodiments of the present disclosure, the antenna module 10 may be disposed at a side of the frame 9 of the electronic device. According to various embodiments of the present disclosure, as described above, the antenna module 10 may be separately prepared as a carrier, and then may be disposed on various locations such as a lower end or an upper end of the frame 9 of the electronic device.

Figure 2:
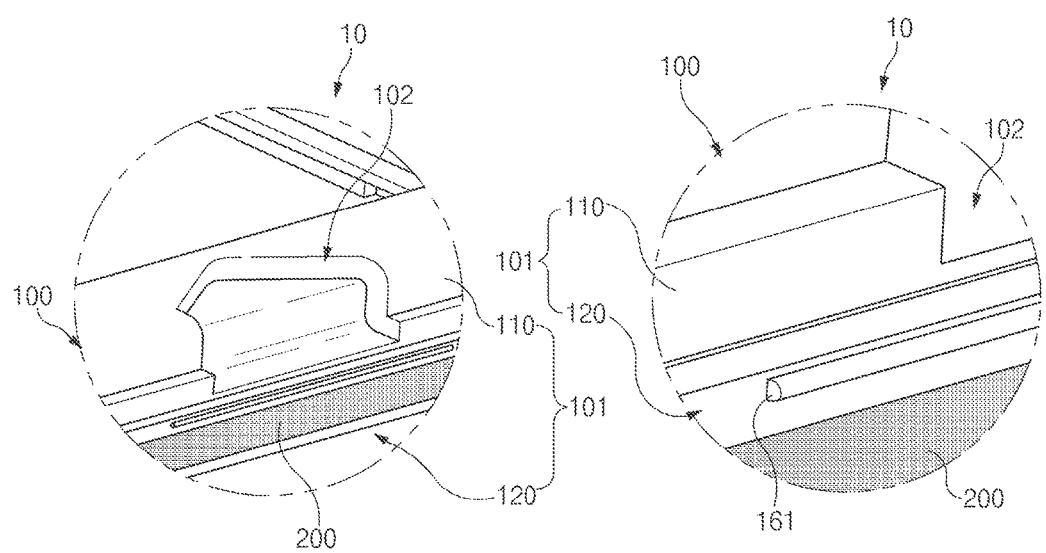
FIG. 2 illustrates an antenna module including a rib-type antenna protection part according to an embodiment of the present disclosure.

FIG. 2 illustrates an antenna module including a rib-type antenna protection part according to an embodiment of the present disclosure.

Referring to FIG. 2, an antenna module 10 is illustrated, where the antenna module 10 may include a case 100 and an antenna 200. The case 100 may include a body part 101, a gate part 102, and a rib 161. Here, the rib 161 may be the above-mentioned antenna protection part 160.

According to various embodiments of the present disclosure, the body part 101 of the case 100 may include, for example, a side part 120 and a rear part 110 (or a front part 130 as illustrated in FIG. 1A). The gate part 102 related to injection molding of a case 300 may be provided to one side of the rear part 110. According to various embodiments of the present disclosure, at least one stepped part may be disposed on a connection area between the side part 120 and the rear part 110. The rib 161 may be disposed on one side of the side part 120. The antenna 200 may be disposed on one side of the side part 120. According to an embodiment of the present disclosure, at least a part of the antenna 200 may be disposed along the circumference of the side part 120. According to an embodiment of the present disclosure, the case 100 may be made of a platable plastic material. Accordingly, the antenna 200 may be provided through plating (or printing) on a plating pattern (or a printing pattern) formed by laser processing. The antenna 200 disposed on the side part 120 may be adjacent to the rib 160.

According to an embodiment of the present disclosure, the case 100 may be made of a non-platable plastic material. Therefore, the antenna 200 may be formed using a direct pattern intenna (DPI) technique. For example, the case 100 may undergo laser processing so that a designated area of the case 100 has a certain roughness, and then a platable material (e.g., palladium) may be applied to the designated area. The antenna 200 may be formed through plating or printing on the designated area on which the platable material is applied. A rail or a rib corresponding to the antenna protection part 160 may be formed on at least a part of an area of the case 100 adjacent to an area on which the antenna 200 is formed. Alternatively, a protective layer may be formed on at least a part of the area on which the antenna 200 is formed.

According to various embodiments of the present disclosure, the antenna 200 may be disposed on the case 100 using at least one of various techniques such as a printing technique (e.g., dot printing, inkjet printing or pad printing) and an SUS disposition technique. The above-mentioned rib (e.g., the antenna protection part 160) may be disposed on an area of at least a part of the antenna 200 in-molded by the case 300.

The gate part 102 may be provided to one side of the case 100. An injection fluid of a second case may flow through the gate part 102. According to an embodiment of the present disclosure, the gate part 102 may be formed in the shape of a groove including a certain portion of the rear part 110 and a certain portion of the side part 120.

FIG. 2 illustrates that the gate part 102 is sharp edged in a direction from the rear part 110 to a center portion of the rear part 110, but various embodiments of the present disclosure are not limited thereto. For example, the gate part 102 may be formed in various shapes such as a semicircular shape, a semi-elliptic shape and a star shape. When the injection fluid of the second case 102 flows into a mold chamber in which the case 100 is disposed through the gate part 102, the injection fluid of the second case may cover at least a part of the antenna 200. For example, the injection fluid of the second case may cover the entirety of at least a part of the antenna 200 disposed on the side part 120.

The rib 161 may be disposed on at least one side of the side part 120. According to an embodiment of the present disclosure, the rib 161 may be disposed on the side part 120 adjacent to the gate part 102. According to various embodiments of the present disclosure, the rib 161 may be disposed in parallel with the side part 120 along a longitudinal direction of the side part 120. The rib 161 may have the shape of a groove protruding from a surface of the side part 120 by a certain distance. The rib 161 may be longer than the groove of the gate part 102 disposed on the side part 120. According to various embodiments of the present disclosure, the rib 161 may be disposed on at least one of an upper edge and a lower edge of the side part 120. The rib 161 may be disposed in parallel with at least a part of the antenna 200 disposed in a longitudinal direction.

According to an embodiment of the present disclosure, the rib 161 may be disposed between the groove of the gate part 102 and the antenna 200 to prevent the antenna 200 from being deformed or damaged by the injection fluid of the second case. For example, since the injection fluid of the second case is injected into the mold chamber through the gate part 102, the injection fluid of the second case introduced through the gate part 102 may have a relatively high temperature and high pressure. Here, since the injection fluid of the second case flows to the surface of the antenna 200 via the rib 161, the antenna 200 may be prevented from being deformed or damaged by the injection fluid of the second case having a high temperature and high pressure.

Figure 3:
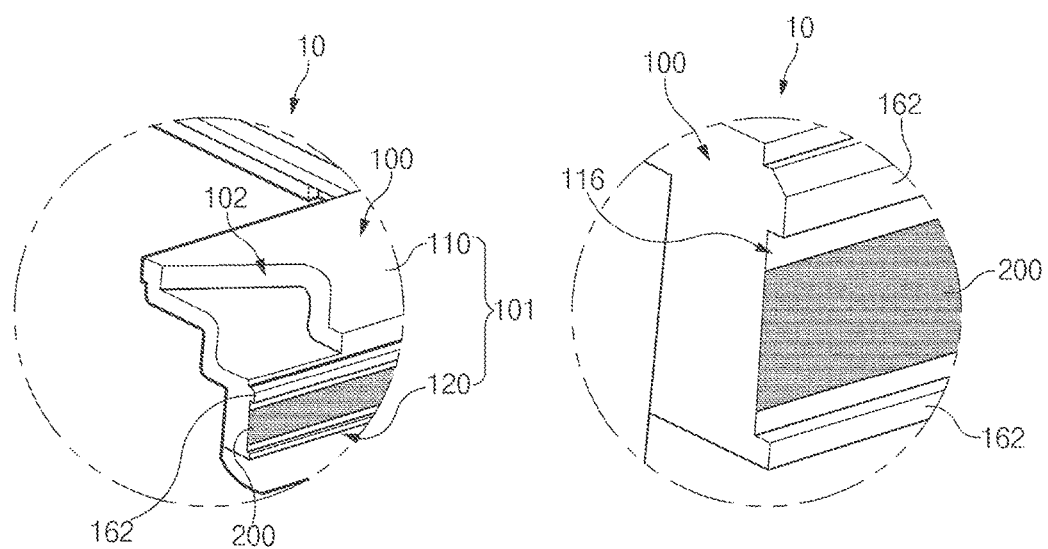
FIG. 3 illustrates an antenna module including a rail-type antenna protection part according to an embodiment of the present disclosure.

FIG. 3 illustrates an antenna module including a rail-type antenna protection part according to an embodiment of the present disclosure.

Referring to FIG. 3, an antenna module 10 is illustrated, where the antenna module 10 may include a case 100 and an antenna 200. The case 100 may include a body part 101, a gate part 102, and a rail 162.

The body part 101 of the case 100 may include a side part 120 and a rear part 110 (or a front part 130, as illustrated in FIG. 1A). The gate part 102 may be provided to at least one of the rear part 110 and the side part 120. According to an embodiment of the present disclosure, at one side of the side part 120 (e.g., a center portion of the side part 120), a longitudinal groove 116 in which the antenna 200 is disposed may be disposed along at least a part of the circumference of the side part 120. The rail 162 may be disposed at both sides of the longitudinal groove 116.

The gate part 102 may be formed in the shape of a groove in certain areas of the side part 120 and the rear part 110. According to various embodiments of the present disclosure, the gate part 102 may be formed by engraving at least a part of the side part 120 and the rear part 110. The injection fluid of the second case may flow through the gate part 102 during a forming process of the case 300.

At an edge area of the side part 120 or at an edge area of the longitudinal groove 116 disposed on the side part 120, the rail 162 may extend at a certain angle from the surface of the side part 120 in a height direction. According to an embodiment of the present disclosure, the rail 162 may vertically extend from the surface of the side part 120 at an edge of the side part 120 so as to serve as a sidewall of the longitudinal groove 116. According to an embodiment of the present disclosure, the rail 162 may be disposed along an area of the side part 120 on which the antenna 200 is disposed.

Alternatively, the rail 162 may be disposed on the entire area of the side part 120. The rail 162 may reduce a flow rate of the injection fluid of the second case while the injection fluid of the second case is introduced after the case 100 is disposed in the mold chamber in relation to forming of the second case. The rail 162 may prevent the injection fluid of the second case from being disposed on the antenna 200 with high pressure so that the antenna 200 may be prevented from being damaged or deformed.

Figure 4:
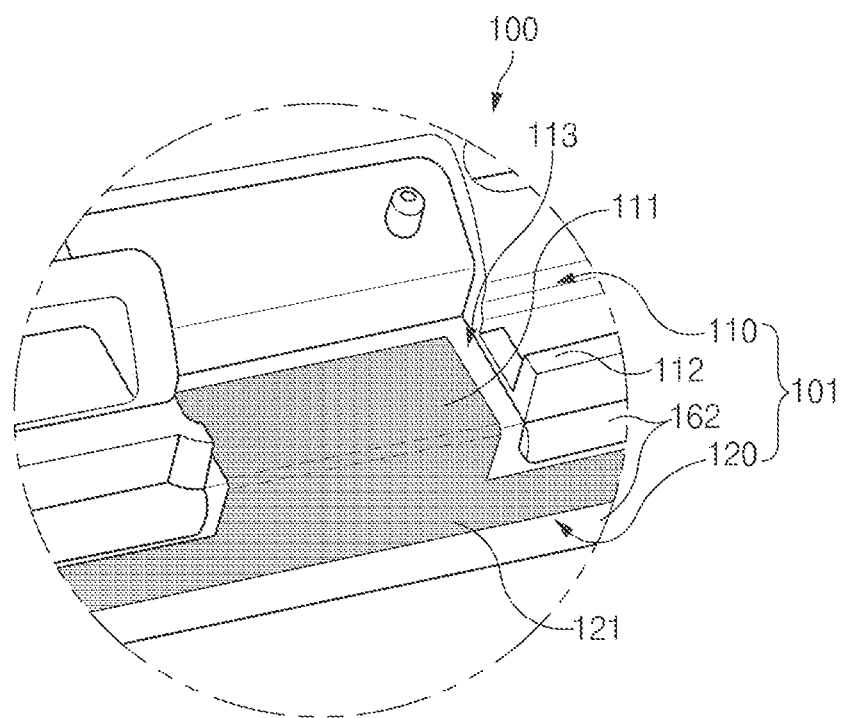
FIG. 4 illustrates a part of an antenna module including an antenna protection part related to a mold according to an embodiment of the present disclosure.

FIG. 4 illustrates a part of an antenna module including an antenna protection part related to a mold according to an embodiment of the present disclosure.

Referring to FIG. 4, a part of a case 100 of antenna module is illustrated.

Specifically, an antenna 200, as illustrated in FIG. 1A, may include an antenna pattern 121 disposed on one side of a side part 120 along a longitudinal direction thereof and an antenna pattern 111 disposed on one side of a rear part 110, the antenna pattern 111 being connected to the antenna pattern 121. According to various embodiments of the present disclosure, the antenna pattern 121 may be formed to a designated length along the circumference of the side part 120 and may have certain thickness and width. According to an embodiment of the present disclosure, the antenna pattern 121 may be formed on the case 100 made of a platable plastic material through the LDS. Alternatively, the antenna pattern 121 may be formed on the case 100 made of a non-platable material using various techniques such as inkjet printing, dot printing, pad printing, SUS disposition, FPCB disposition, DPI, and laser direct plating (LDP).

One side of the antenna pattern 121 may be electrically connected to the antenna pattern 111. According to an embodiment of the present disclosure, the antenna pattern 111 may serve as a connection part of the antenna pattern 121. For example, the antenna pattern 111 may serve as a connection part for electrically connecting an extension-type antenna module to another antenna module or another antenna pattern. The antenna pattern 111 may be disposed on one side of the rear part 110.

The case 100 may include the body part 101 and a protective rib 112.

According to various embodiments of the present disclosure, the body part 101 of the case 100 may serve to support at least a portion of various elements of the electronic device. According to an embodiment of the present disclosure, the case 100 may be deformed into the second case after the antenna 200 is disposed. For example, the case 100 may be transformed into the second case including an injection material that covers at least a part of an area of the antenna 200 disposed on the case 100. According to an embodiment of the present disclosure, the body part 101 of the case 100 may include the side part 120 and the rear part 110 (or a front part 130, as illustrated in FIG. 1A). The antenna pattern 121 may be disposed on the side part 120.

According to an embodiment of the present disclosure, a rail 162 may be disposed on an edge of the side part 120. According to various embodiments of the present disclosure, as described above, the rail 162 may serve to reduce the flow rate of the injection fluid of the second case. Alternatively, the rail 162 may serve as a barrier of the antenna pattern 121 against the injection fluid of the second case. Alternatively, the rail 162 may serve to prevent a mold related to the second case from contacting the antenna pattern 121 directly. In this manner, the rail 162 may prevent the antenna pattern 121 from being damaged or deformed by the mold having a high temperature.

According to an embodiment of the present disclosure, a pattern groove 113 may be disposed in one side of the rear part 110. The antenna pattern 111 may be disposed in the pattern groove 113. The protective rib 112 may be disposed on at least one of both sides of the pattern groove 113 in which the antenna pattern 111 is disposed. According to various embodiments of the present disclosure, at least a part of the antenna pattern 111 may be disposed to the outside. The protective rib 112 may have the shape of a projection protruding from a surface of the rear part 110 by a certain distance at both sides of the pattern groove 113 disposed on one side of the rear part 110. The protective rib 112 may serve to prevent a mold from contacting the antenna pattern 111 directly when the case 100 is disposed in a mold chamber while being transformed into the second case.

Figure 5:
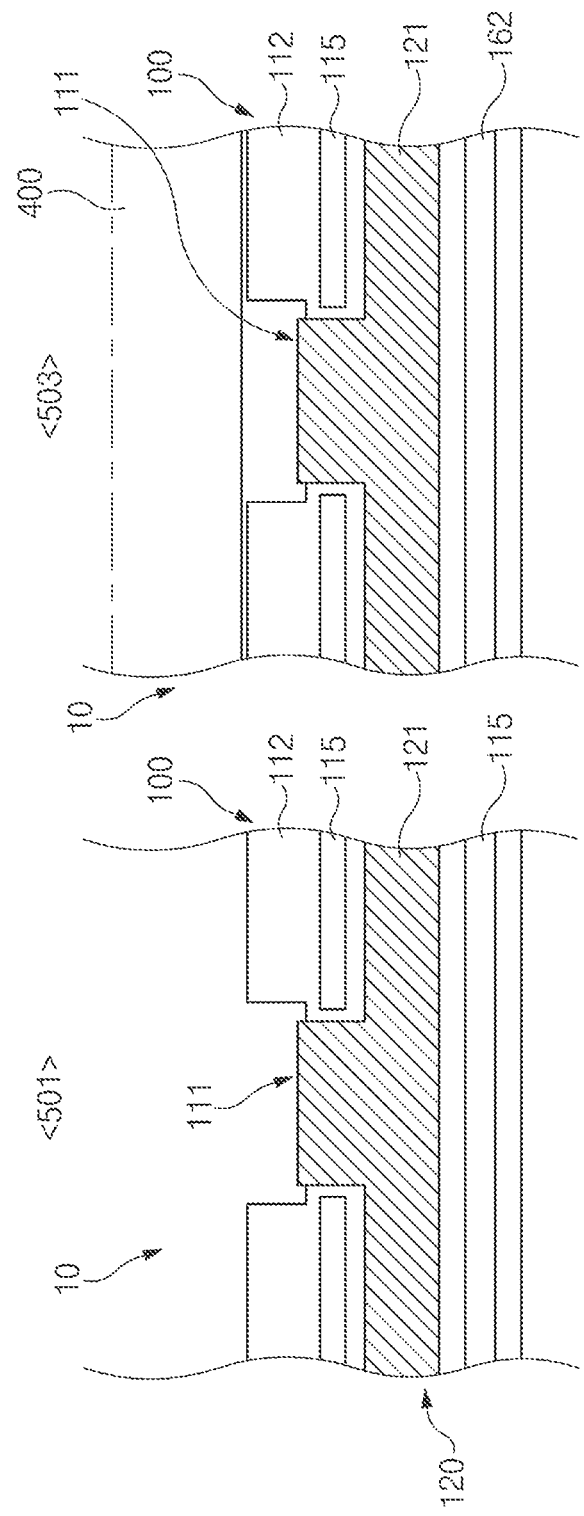
FIG. 5 is a diagram illustrating a part of a manufacturing process of an antenna module according to an embodiment of the present disclosure.

FIG. 5 is a diagram illustrating a part of a manufacturing process of an antenna module according to an embodiment of the present disclosure.

Referring to FIG. 5, an antenna module 10 is illustrated, where the antenna module 10 may include an antenna pattern 121 that may be disposed on a side part 120 of the antenna module 10 in a case 100 and a rail 162, as illustrated in FIG. 3, may be disposed in parallel with an antenna 200 of FIG. 1A, as illustrated in state 501.

An antenna pattern 111 may be disposed towards a rear part 110, as illustrated in FIG. 1A, while being connected to the antenna pattern 121. According to an embodiment of the present disclosure, the antenna pattern 111 may be disposed on a surface of the rear part 110. For example, the antenna pattern 111 may be disposed on a bottom surface of the pattern groove 113, as illustrated in FIG. 4. Further, a protective rib 112 may be disposed on at least one of both sides of the antenna pattern 111.

A mold 400 may be disposed to form the second case as illustrated in state 503. According to various embodiments of the present disclosure, the mold 400 may be disposed on at least one of an upper part and a lower part of the case 100. The mold 400 may be disposed on the protective rib 112 while being disposed on the rear part 110 of the case 100. Accordingly, the mold 400 may not directly contact the antenna pattern 111, and a gap may be formed between the mold 400 and the antenna pattern 111 by the protective rib 112.

If the injection fluid of the second case is introduced while the mold 400 is placed, the injection fluid of the second case may surround a part of the antenna pattern 111 and the side part 120 of the case 100. Accordingly, the case 300, as illustrated in FIG. 1A, may be disposed on the entirety of the side part 120 of the case 100 and a part of the antenna pattern 111. At least a part of the antenna pattern 111 may be disposed to the outside. The antenna pattern 111 exposed to the outside may be electrically connected to another antenna module through a conductive accessory (e.g., a conductive elastic body).

Figure 6:
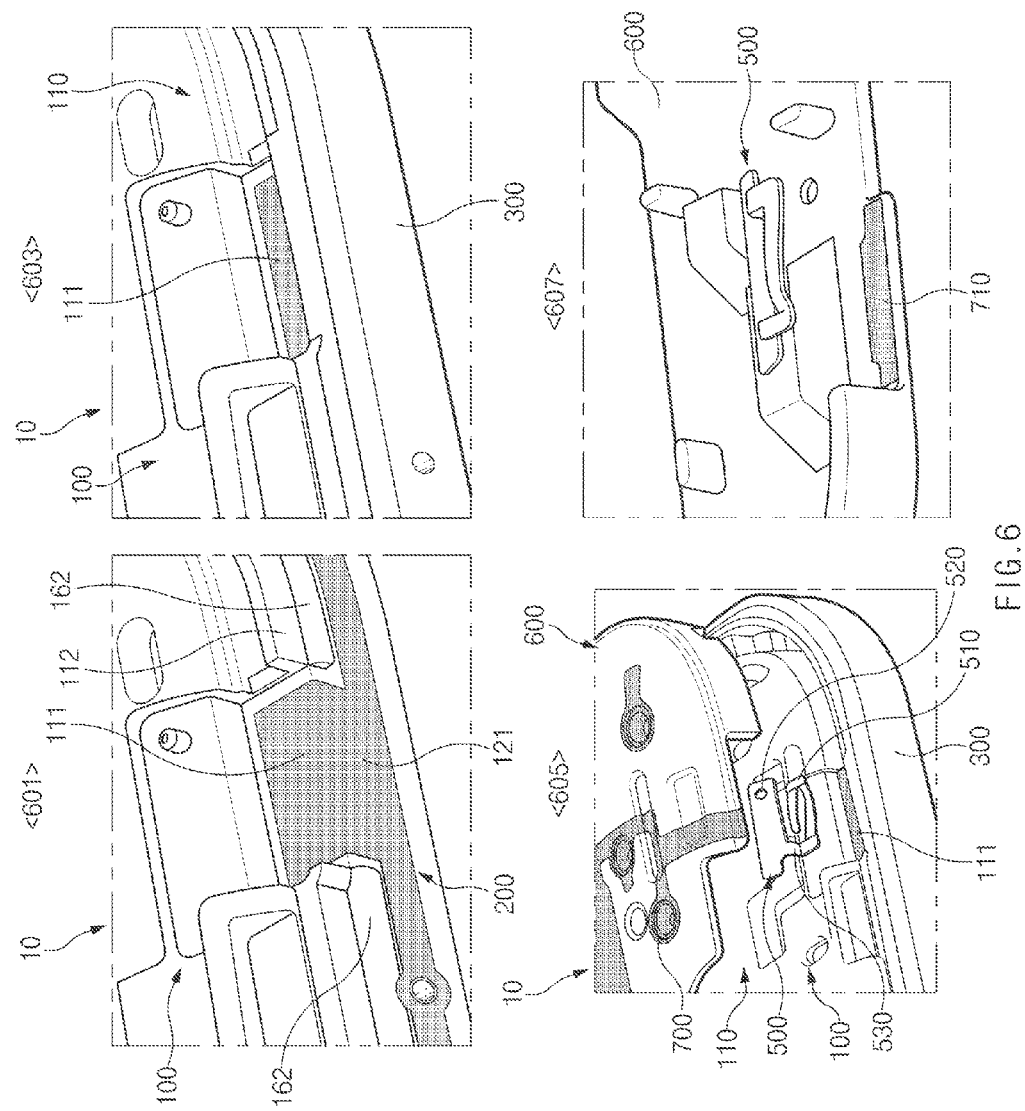
FIG. 6 illustrates an assembly of an extension-type antenna module according to an embodiment of the present disclosure.

FIG. 6 illustrates an assembly of an extension-type antenna module according to an embodiment of the present disclosure.

Referring to FIG. 6, item 601 is illustrated in which an antenna module 10 includes an antenna 200 may include an antenna pattern 121 and an antenna pattern 111. A protective rib 112 may be disposed on at least one of both sides of the antenna pattern 111. As described above with reference to FIG. 4, the antenna pattern 121 may be disposed on one side of the side part 120 of the case 100. According to an embodiment of the present disclosure, at least a part of the antenna pattern 121 may be formed along the circumference of the side part 120. Here, the antenna pattern 121 may be adjacent to the rail 162 disposed on the side part 120.

Referring to item 603 of FIG. 6, a case 300 may be disposed to cover at least a part of the case 100 based on the manufacturing process described above with reference to FIG. 5. For example, the case 300 may cover the entirety of the side part 120 of the case 100 or an area of the side part 120 on which the antenna pattern 121 is disposed. Furthermore, the case 300 may be such disposed that a part of the entire area of a rear part 110 of the case 100, for example, at least a part of the antenna pattern 111, is disposed. According to various embodiments of the present disclosure, the case 300 may be separately prepared and then may be joined to the case 100 to surround the side part 120 of the case 100. According to various embodiments of the present disclosure, the case 100 may be made of a platable plastic material.

For example, the material of the case 100 may allow disposition of an antenna through the LDS. According to various embodiments of the present disclosure, the case 300 may be made of a platable plastic material or a non-platable plastic material. According to an embodiment of the present disclosure, the above-mentioned rail 162 may be disposed on an adjacent area to at least a part of the antenna 200 (formed through one of the LDS, dot printing, inkjet printing, FPCB structure and SUS structure) in-molded by the case 300.

Referring to item 605 of FIG. 6, a conductive elastic body 500 may be disposed on the antenna pattern 111. According to various embodiments of the present disclosure, the conductive elastic body 500 may include a first support part 510 electrically connected to the antenna pattern 111, a second support part 520 electrically connected to an antenna 700, and a connection part 530 for connecting the first support part 510 to the second support part 520. The first support part 510, the second support part 520, and the connection part 530 may be made of the same or similar materials. When the antenna 700 is joined to at least one of the case 300 or the case 100 on which the antenna pattern 111 is disposed, the conductive elastic body 500 may electrically connect the antenna pattern 111 to the antenna 700. The conductive elastic body 500 may be implemented with a C-clip, a pogo pin, or another metallic material.

The antenna 700 may be disposed on an auxiliary case 600. The auxiliary case 600 may be prepared separately from the case 100 or the case 300, and the antenna 700 may be electrically connected to the antenna pattern 111 through the conductive elastic body 500. According to various embodiments of the present disclosure, the auxiliary case 600 may be hook- or boss-joined to at least one of the case 100 and the case 300. Alternatively, the auxiliary case 600 may be screw-joined to at least one of the case 100 and the case 300. The antenna 700 may be disposed on a first surface of the auxiliary case 600. According to various embodiments of the present disclosure, the auxiliary case 600 may be made of a material that is the same as or similar to that of the case 100, for example, a platable plastic material. Therefore, the antenna 700 may be formed through the LDS.

As illustrated in item 607 of FIG. 6, an auxiliary contact 710 electrically connected to the conductive elastic body 500 may be disposed on a second surface of the auxiliary case 600. The auxiliary contact 710 may be electrically connected to the antenna 700 disposed on the first surface. According to an embodiment of the present disclosure, the auxiliary case 600 may be a carrier. According to an embodiment of the present disclosure, the auxiliary case 600 may be made of a platable plastic material. According to an embodiment of the present disclosure, the antenna 700 may be formed through plating or printing on the auxiliary case 600 after performing laser patterning thereon according to the LDS technique. Since the auxiliary case 600 covers at least a part of the case 300 or the case 100 while electrically contacting the antenna pattern 111, at least a part of the antenna 700 may be exposed to the outside. At least a part of the antenna 700 exposed to the outside may be removed or extended during a process of inspecting and compensating an antenna characteristic (e.g., a frequency characteristic).

As described above, the extension-type antenna module 10 may include the case 100, the first antenna 200, the conductive elastic body 500, and the auxiliary case 600 on which the antenna 700 is disposed. At least a part of the first antenna 200 may be exposed from the case 100 on which the case 300 is disposed or the case 100. The antenna 700 may be electrically connected to the first antenna 200 disposed on the case 100 by virtue of the conductive elastic body 500. Accordingly, the extension-type antenna module 10 may have an antenna pattern including the first antenna 200 and the antenna 700. According to various embodiments of the present disclosure, since at least a part of the antenna 700 is exposed to the outside, the antenna module 10 to which the auxiliary case 600 is joined may facilitate the compensation of an antenna characteristic.

Figure 7:
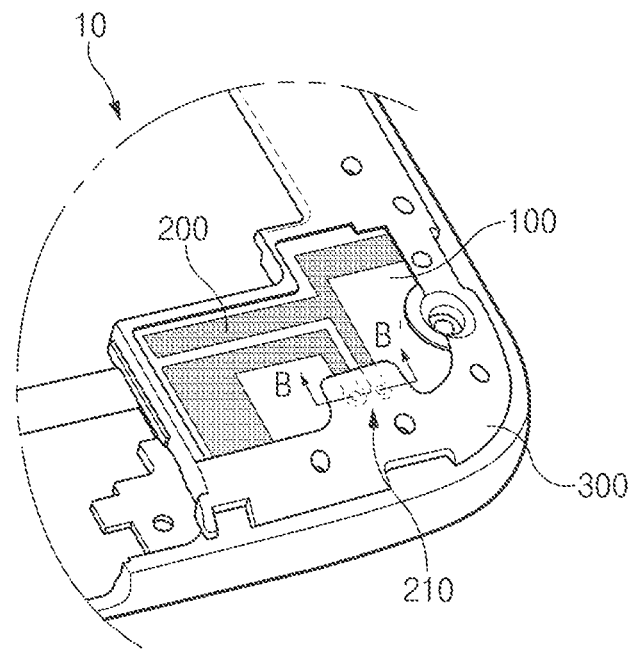
FIG. 7 illustrates a contact-connected antenna module according to an embodiment of the present disclosure.
Figure 7:
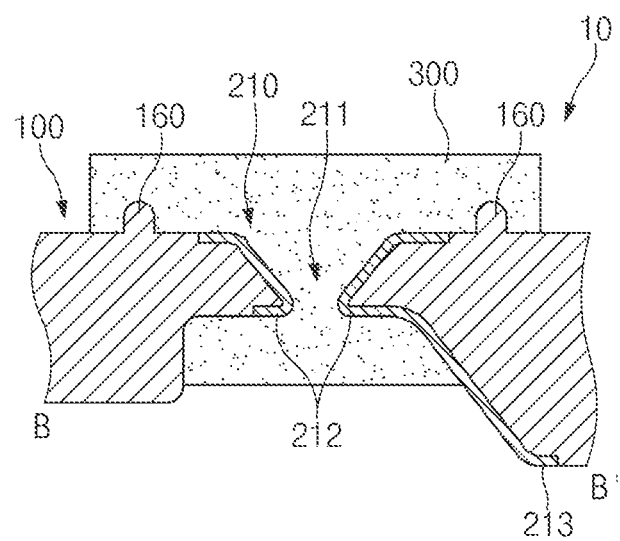

FIG. 7 illustrates a contact-connected antenna module according to an embodiment of the present disclosure.

Referring to FIG. 7, an antenna module 10 is illustrated, where the antenna module may include a case 100, an antenna 200, and a case 300.

The case 100 may be made of, for example, a platable plastic material. The antenna 200 may be disposed on at least a part of the surface of the case 100. According to various embodiments of the present disclosure, at least a part of the case 100 may be joined to the case 300. For example, the injection fluid of the second case may be provided to cover at least a part of the case 100 so that the case 300 may be formed. According to an embodiment of the present disclosure, the case 300 may be disposed on the side part of the case 100 on which at least a part of the antenna 200 is disposed. Furthermore, according to various embodiments of the present disclosure, the case 300 may be disposed on an edge area of the case 100.

According to an embodiment of the present disclosure, the antenna 200 may be disposed on the case 100 using the LDS technique. For example, the antenna 200 may be disposed on the rear part 110, as illustrated in FIG. 1A, of the case 100 in a designated pattern. At least a part of the case 300 may be disposed on at least a part of the antenna 200. According to an embodiment of the present disclosure, the case 300 may be disposed on a contact connection part 210 of the antenna 200. Once the case 300 is disposed on the contact connection part 210, the through-hole-type contact connection part 210 may be closed.

Referring to the cross section taken along line B-B', the antenna module 10 may include the antenna 200 in which the contact connection part 210 including a through-hole 211, an antenna hole pattern 212, and a contact part 213 is disposed, the case 100 including an antenna protection part 160, and the case 300. The through-hole 211 may be tapered towards a center portion thereof. According to various embodiments of the present disclosure, a cross section of the through-hole 211 may have at least one angle. For example, the cross section of the through-hole 211 may be shaped like a triangle, a quadrangle, a pentagon, or the like. The antenna hole pattern 212 may be disposed on the surface of the case 100 which defines (or forms) the through-hole 211. The case 300 may be disposed on an upper part and a lower part of the through-hole 211. The antenna protection part 160 may be disposed to surround at least a part of the periphery of the contact connection part 210.

Figure 8:
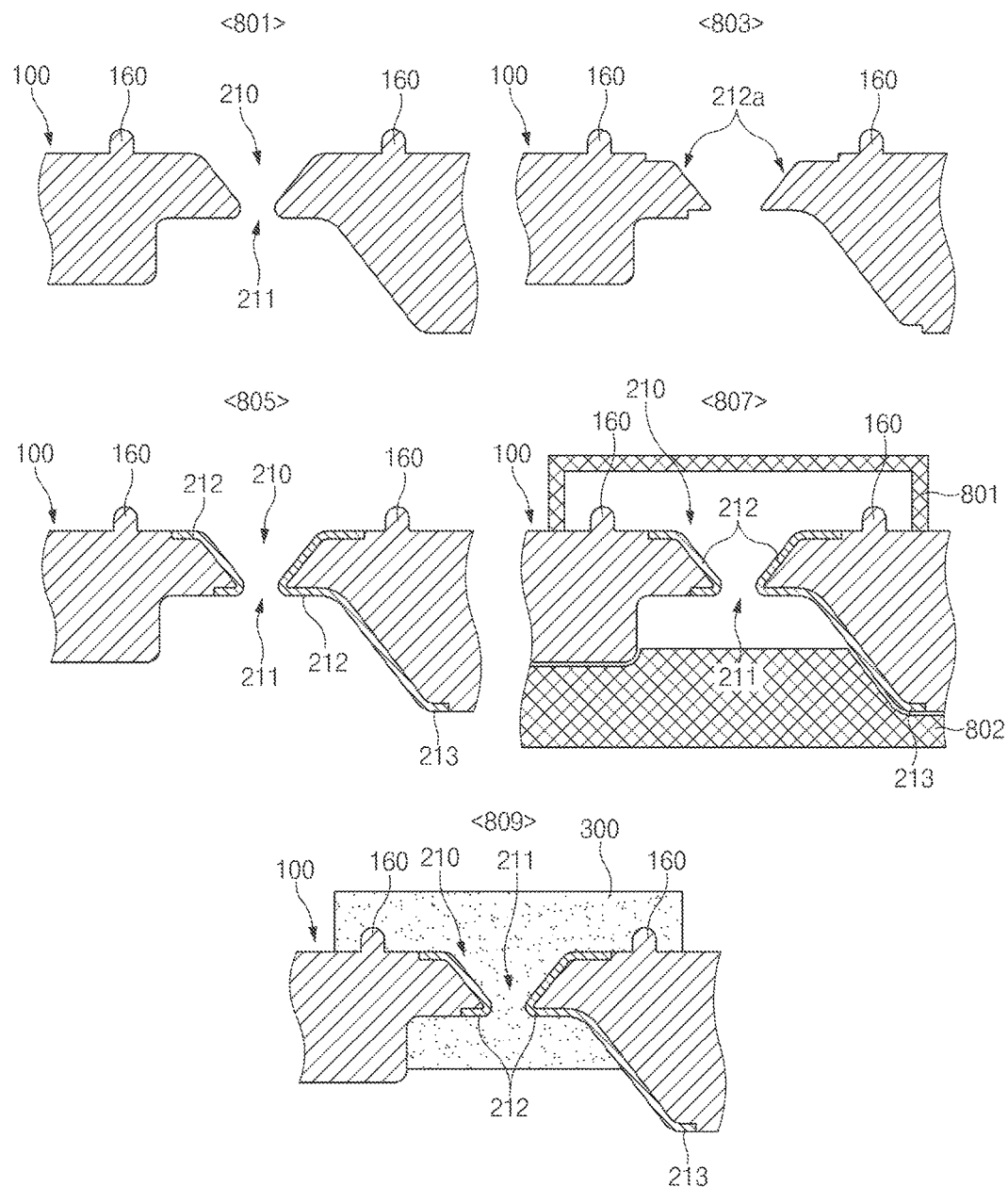
FIG. 8 illustrates a contact treating method according to an embodiment of the present disclosure.

FIG. 8 illustrates a contact treating method according to an embodiment of the present disclosure. This contact treating method may be applied to at least one through-hole or connection through-hole disposed in an antenna module.

Referring to FIG. 8, a case 100 may be provided as illustrated in item 801. Here, a first mold corresponding to the case 100 may be provided, and an injection fluid of the first case may be injected into the first mold so as to provide the case 100. The first mold may be such provided that the case 100 includes an antenna protection part 160 and a through-hole 211. Here, the antenna protection part 160 may surround at least a part of a contact connection part 210. For example, the antenna protection part 160 may be at least one projection disposed at the periphery of the contact connection part 210. Alternatively, the antenna protection part 160 may be a rail surrounding the contact connection part 210. The injection fluid of the first case may be a platable material (e.g., a platable plastic material).

When the case 100 is prepared, laser patterning 212a may be performed to define an area of an antenna hole pattern 212 as illustrated in items 803 and 805. Here, a depth of the area defined by the laser patterning 212a may be equal or similar to a height of the antenna hole pattern 212. The laser patterning 212a may be performed on an upper part and a lower part of the through-hole 211. The center portion of the through-hole 211 may be different from an outer portion of the through-hole 211 with respect to a cross section so that the laser patterning 212a is enabled. For example, the cross section of the through-hole 211 may be gradually reduced in a direction from the outer portion to the center portion.

After the laser patterning 212a is performed, an antenna pattern (e.g., the antenna hole pattern 212 and a contact part 213) may be provided through a plating or printing process as illustrated in 805. At least one of the antenna hole pattern 212 and the contact part 213 may be made of a conductive material. At least one of the antenna hole pattern 212 and the contact part 213 may electrically connect the front of the case 100 to the rear thereof. FIG. 8 illustrates that the antenna hole pattern 212 is formed so that the through-hole 211 is open, but various embodiments of the present disclosure are not limited thereto. For example, the antenna hole pattern 212 may be such formed as to close the through-hole 211. The contact part 213 may be electrically connected to the antenna hole pattern 212. The contact part 213 may serve as a contact electrically connected to a printed circuit board or another antenna module.

When the antenna pattern is prepared, a process of disposing the case 300 that covers the front and rear of the contact connection part 210 may be performed as illustrated in 807. In this process, an upper mold 801 that covers a partial space of an upper part of the contact connection part 210 and a lower mold 802 that maintains a partial space of a lower part of the contact connection part 210 may be disposed.

If the injection fluid of the second case is introduced after the upper mold 801 and the lower mold 802 are disposed, a case 300 may be disposed in a certain space of the upper part of the contact connection part 210 and a certain space of the lower part of the contact connection part 210 as illustrated in 809. Here, the injection fluid of the second case introduced into a partial space of the lower mold 802 may fill the lower part of the contact connection part 210 while the injection fluid of the second case is introduced into the first mold 801 and covers the upper part of the contact connection part 210. Accordingly, the antenna module 10 according to various embodiments of the present disclosure may be such formed that the antenna hole pattern 212 disposed at the upper part of the contact connection part 210 or the antenna hole pattern 212 disposed at the lower part of the contact connection part 210 may be prevented from being deformed or damaged by the injection fluid of the second case.

Figure 9A:
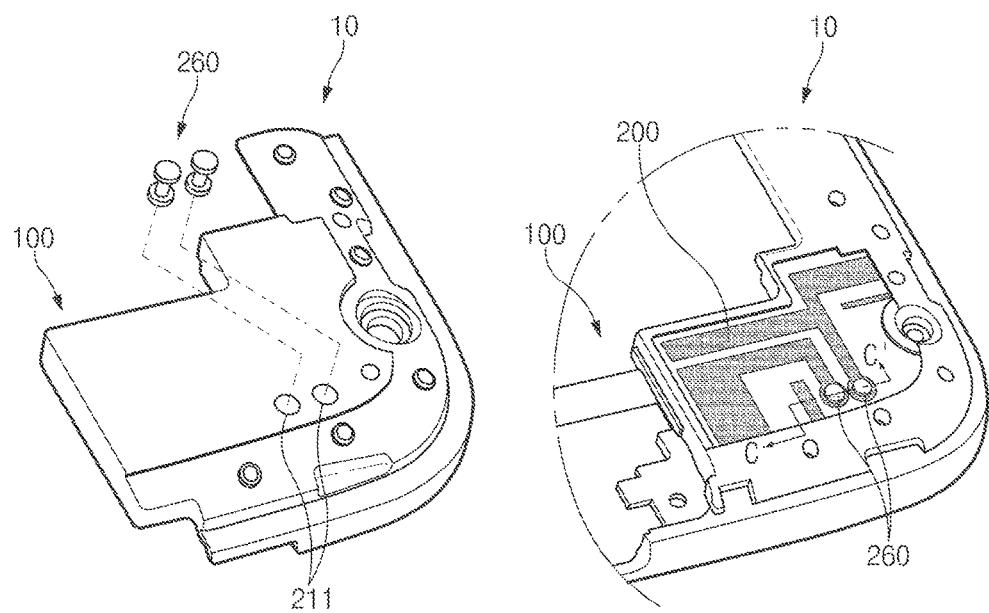
FIG. 9A illustrates an antenna module including an insert pin according to an embodiment of the present disclosure.

FIG. 9A illustrates an antenna module including an insert pin according to an embodiment of the present disclosure.

Referring to FIG. 9A, an antenna module 10 is illustrated, where the antenna module 10 may include a case 100 in which an insert pin 260 is disposed in a through-hole 211. Here, according to an embodiment of the present disclosure, during an injection molding process of the case 100, the insert pin 260 may be disposed in a mold, and then the injection fluid of the first case may be injected so that the case 100 including the insert pin 260 may be formed. According to various embodiments of the present disclosure, after the case 100 including the through-hole 211 is prepared, the insert pin 260 may be disposed so as to pass through the through-hole 211.

Alternatively, the insert pint 260 may be interference fit into the through-hole 211. Alternatively, the insert pint 260 may be separable and joinable. For example, the insert pin 260 may include a first substrate part, a second substrate part, and a pillar part for connecting the first substrate part to the second substrate part. A cross section of the pillar part may be equal or similar to or larger than that of the through-hole 211. After the pillar part of the insert pin 260 is inserted into the through-hole 211, the first and second substrate parts may be disposed on both ends of the pillar part.

According to various embodiments of the present disclosure, a screw thread may be provided to at least one of the ends of the pillar part. The first substrate part may be screw-joined to the second substrate part. According to various embodiments of the present disclosure, the insert pin 260 including the pillar part may be formed, and then may be inserted into the through-hole 211. After the insert pin 260 is inserted, the insert pin 260 may be electrically connected to an antenna 200 disposed on the through-hole 211 by virtue of a soldering operation.

Figure 9B:
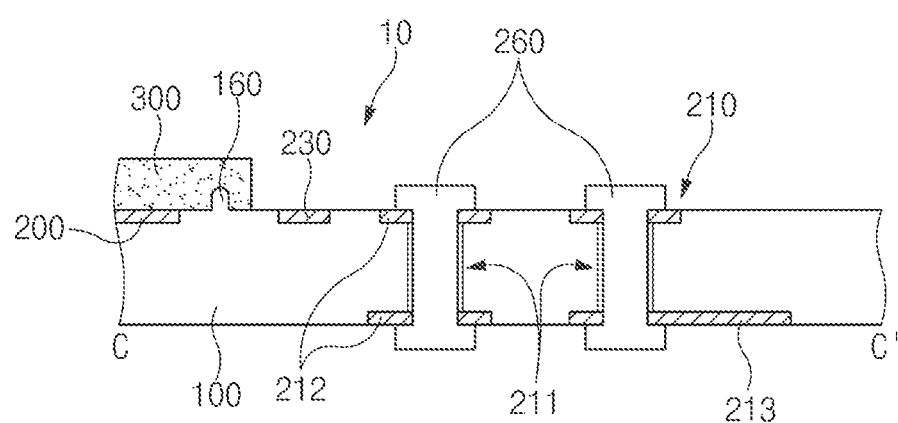
FIG. 9B illustrates a cross section of an antenna module in which an insert pin is inserted according to an embodiment of the present disclosure.

FIG. 9B illustrates a cross section (showing a cross section taken along line C-C' of FIG. 9A) of an antenna module in which an insert pin is inserted according to an embodiment of the present disclosure.

Referring to FIG. 9B, an antenna module 10 is illustrated, where the antenna module 10 includes a contact connection part 210 having at least one through-hole 211 may be provided to a case 100. An insert pin 260 may be disposed in the through-hole 211 of the case 100. As described above, the insert pint 260 may be disposed during the injection molding process of the case 100 or may be inserted after the case 100 is injection-molded. An antenna hole pattern 212 may be disposed at an opening of the through-hole 211 in which the inset pin 260 is inserted. The antenna hole pattern 212 may be electrically connected to the antenna pattern 200. A part of the antenna hole pattern 212 may be electrically connected to a contact part 213.

According to various embodiments of the present disclosure, the exposed antenna 200 (e.g., an end part 230) may be disposed on one surface of the case 100 on which a case 300 is not disposed. An antenna protection part 160 may be disposed on an adjacent area to the antenna 200 on an area of the case 100 covered by the case 300. The antenna protection part 160 may be disposed in parallel with the antenna 200. According to various embodiments of the present disclosure, the antenna protection part 160 may be a projection or a rail protruding from the surface of the case 100 by a certain distance. Alternatively, the antenna protection part 160 may be engraved in the surface of the case 100.

Figure 10A:
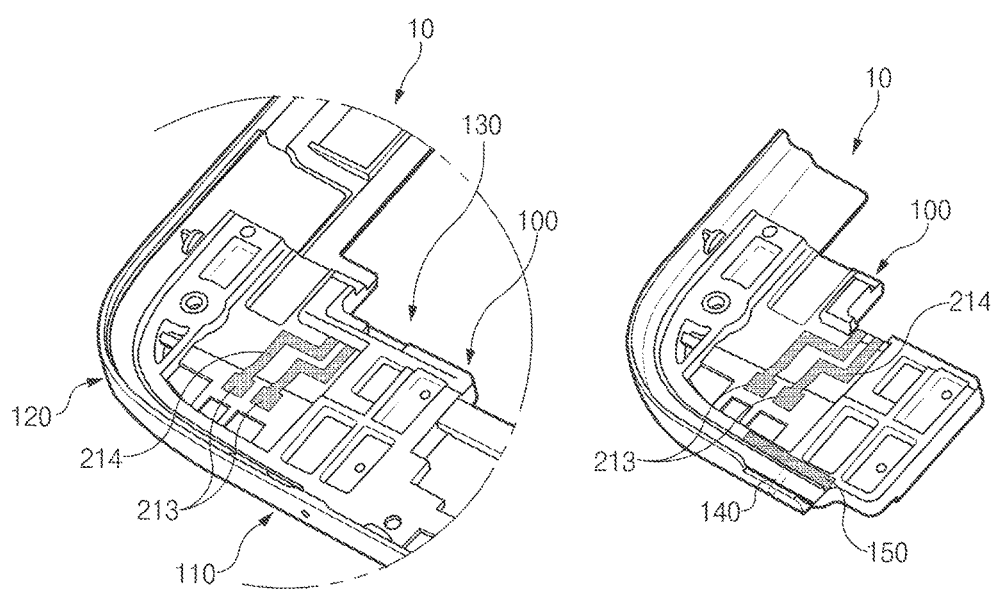
FIG. 10A illustrates a back of an antenna module according to an embodiment of the present disclosure.

FIG. 10A illustrates a back of an antenna module according to an embodiment of the present disclosure.

Referring to FIG. 10A, an antenna module 10 is illustrated, where the antenna module 10 may include a case 100 including at least one of a front part 130, a side part 120 or a rear part 110. Further, a contact part 213 may be disposed on the front part 130. A signal line 214 that is connected to the contact part 213 and is electrically connected to another element such as a printed circuit board or another antenna module may be disposed on the front part 130.

According to various embodiments of the present disclosure, the antenna module 10 may include a front pattern part 150 disposed on one side of the front part 130. According to an embodiment of the present disclosure, the front pattern part 150 may be connected to the antenna 200 through the connection through-hole 140. For example, another end of the connection through-hole 140 electrically connected to the front pattern part 150 may be electrically connected to the antenna 200 disposed on the side part of the case 100. The front pattern part 150 may be disposed on the case 100 through the LDS. According to an embodiment of the present disclosure, at least a part of the front pattern part 150 may be removed or extended in relation to compensation of the performance of an antenna.

Figure 10B:
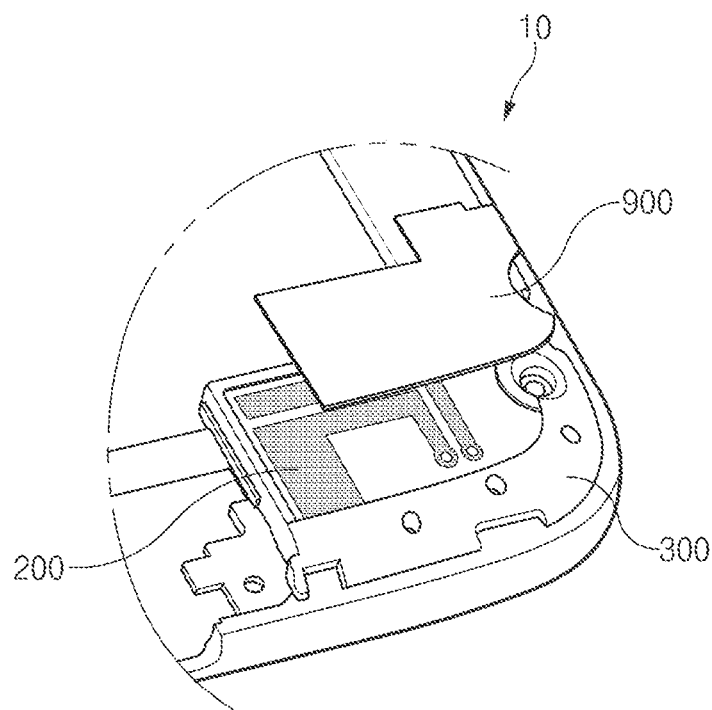
FIG. 10B illustrates a back of an antenna module including a cover according to an embodiment of the present disclosure.

FIG. 10B illustrates the back of an antenna module including a cover according to an embodiment of the present disclosure.

Referring to FIG. 10B, an antenna module 10 is illustrated, where the antenna module 10 may include the case 100, as illustrated in FIG. 1A, on which an antenna 200 is disposed and a case 300 that covers a part of the case 100. The case 300 may be such formed that at least a part of the antenna 200 formed on the case 100 is not exposed or at least a part of the antenna 200 is in-molded. At least a part of the antenna 200 formed on the case 100 may be exposed.

The antenna module 10 may further include a cover 900 for covering the exposed antenna 200. An adhesive layer may be disposed on a surface of the cover 900 facing the case 100. The cover 900 may be such disposed that an area of the case 100 on which the exposed antenna 200 is disposed is covered. The cover 900 may be detached from the case 100 by external pressure. According to an embodiment of the present disclosure, the cover 900 may have a shape that corresponds to an exposed area of the antenna 200 so that the cover 900 covers the exposed antenna 200.

Figure 10C:
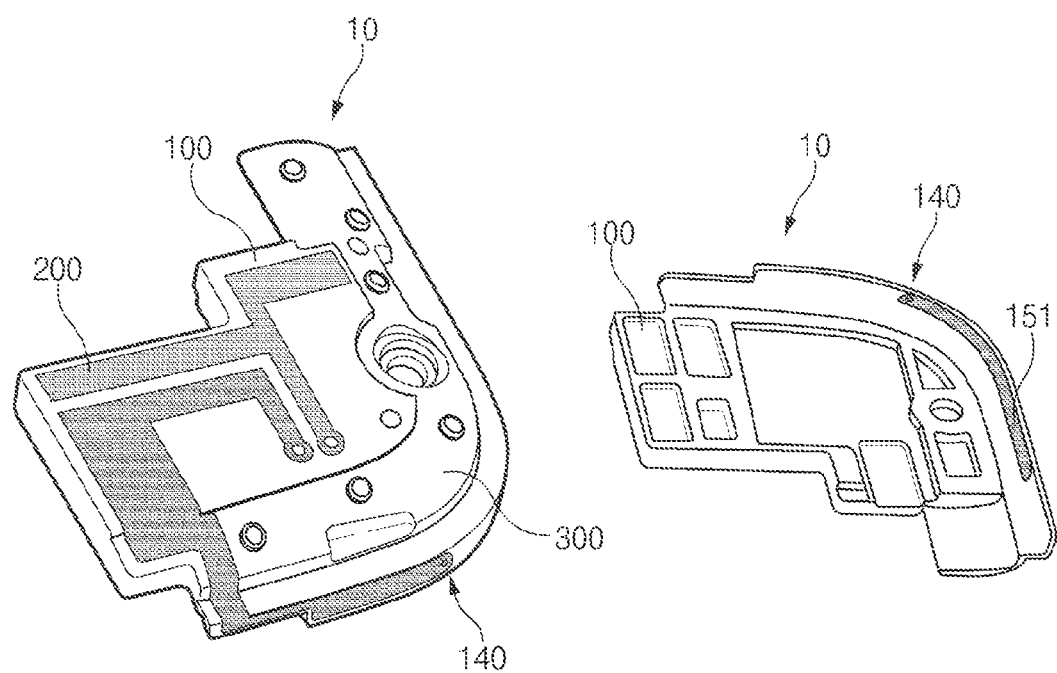
FIG. 10C illustrates an antenna module including an auxiliary pattern according to an embodiment of the present disclosure.

FIG. 10C illustrates an antenna module including an auxiliary pattern according to an embodiment of the present disclosure.

Referring to FIG. 10C, an antenna module 10 is illustrated, where the antenna module 10 may include a case 100 on which an antenna 200 is disposed. Furthermore, the antenna module 10 may further include a case 300 covering at least a part of the case 100. The case 100 may include at least one of the rear part 110, the front part 130, and the side part 120, as illustrated in FIG. 1A.

According to various embodiments of the present disclosure, the antenna 200 may be disposed on a part of the rear part 110 and a part of the side part 120. For example, the antenna 200 may be disposed on an outer border of the side part 120.

Additionally, at least one connection through-hole 140 may be disposed at the outer border of the side part 120. The connection through-hole 140 may pass through the exterior and inner side of the side part 120. An antenna pattern may be disposed in the connection through-hole 140. The connection through-hole 140 or the antenna pattern disposed at the periphery of the connection through-hole 140 may electrically connect the exterior and inner side of the side part 120.

The inner side of the connection through-hole 140 may be electrically connected to an auxiliary pattern 151 disposed inside the side part 120. The auxiliary pattern 151 disposed inside the side part 120 may correspond to an end part of the antenna 200. At least a part of the auxiliary pattern 151 may be deformed in relation to inspection of antenna performance (e.g., inspection of a specific frequency characteristic). For example, at least a part of the auxiliary pattern 151 may be removed or extended. Accordingly, the antenna 200 may be changed in resonance length.

Figure 10D:
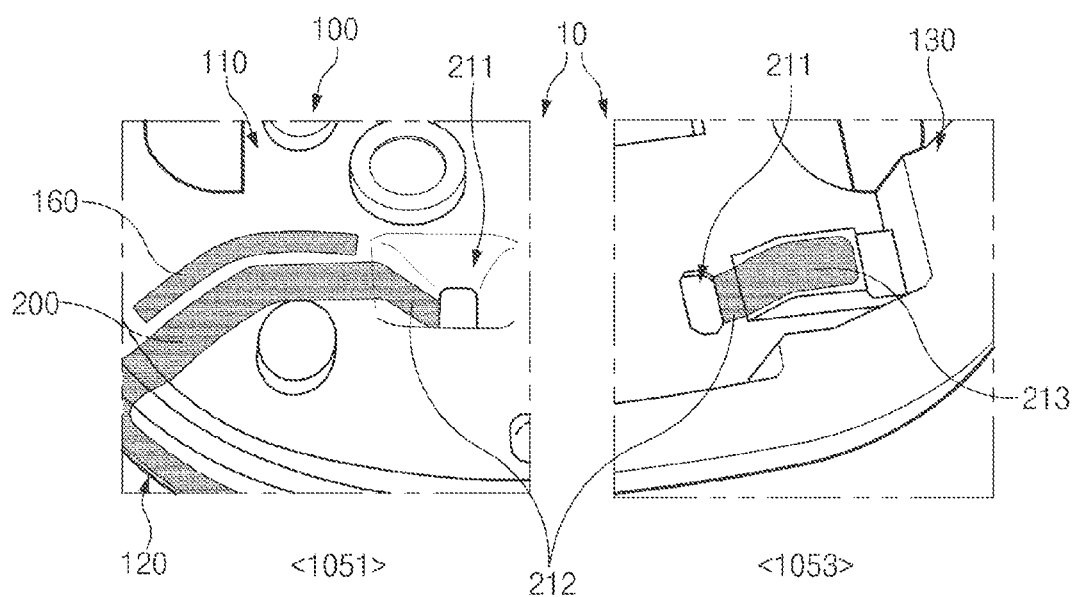
FIG. 10D illustrates an antenna module including a through-hole according to an embodiment of the present disclosure.

FIG. 10D illustrates an antenna module including a through-hole according to an embodiment of the present disclosure.

Referring to FIG. 10D, an antenna module 10 is illustrated, where the antenna module 10 may include a case 100 in which at least one through-hole 211 is disposed. For example, at least one through-hole 211 may be disposed in at least one of a rear part 110, a front part 130, and a side part 120 of the antenna module 10. The through-hole 211 disposed in the rear part 110 may pass through the case 100 so as to be opened towards the front part 130.

In FIG. 10D, item 1051 illustrates a view showing the rear part 110 of the case 100, and item 1053 illustrates a view showing the front part 130 of the case 100. Here, items 1051 and/or 1053 may be one of the front part 130 or the rear part 110.

According to an embodiment of the present disclosure, the antenna 200 may be disposed in at least a part of the rear part 110 or the side part 120. The antenna 200 disposed on the rear part 110 may be connected to an antenna hole pattern 212 disposed in the through-hole 211 of the rear part 110.

The antenna hole pattern disposed in the through-hole 211 of the rear part 110 may be electrically connected to the antenna hole pattern disposed in the through-hole 211 of the front part 130. The antenna hole pattern 212 disposed in the through-hole 211 of the front part 130 may be electrically connected to a contact part 213 disposed on the front part 130. Accordingly, the antenna 200, the antenna hole pattern 212, and the contact part 213 may be electrically connected to one another.

The through-hole 211 may be tapered in a direction from a surface of the rear part 110 to the front part 130. A cross section of the through-hole 211 may have at least one angle. For example, the cross section of the through-hole 211 may be shaped like a polygon such as a triangle, a quadrangle, or the like. The antenna hole pattern 212 may be disposed on at least one surface of the case 100 defining the polygonal through-hole 211.

FIG. 10D illustrates that the antenna hole pattern 212 is disposed on one of surfaces of the rear part 110 defining the through-hole 211. According to various embodiments of the present disclosure, the antenna hole pattern 212 may be disposed on at least one of the surfaces of the rear part 110 defining the through-hole 211. The case 100 including the polygonal through-hole 211 may prevent the antenna hole pattern 212 disposed at the periphery of the through-hole 211 from being deformed or damaged by the injection fluid of the second case during a process in which the case 300 is disposed to cover the through-hole 211.

For example, since a cross section of the through-hole 211 through which the injection fluid of the second case flows from a polygonal opening of the through-hole 211 to the center portion of the through-hole 211 has different shapes at an edge area and a side area, a pressure applied to the antenna hole pattern 212 may be distributed. Accordingly, deformation of the antenna hole pattern 212 by the injection fluid of the second case may be minimized.

At least one antenna protection part 160 may be disposed at the periphery of the antenna 200. For example, the antenna protection part 160 may be disposed on an adjacent area to the antenna 200 disposed on the rear part 110. According to various embodiments of the present disclosure, a plurality of antenna protection parts 160 may be arranged in parallel with the antenna 200 along a longitudinal direction thereof.

According to various embodiments of the present disclosure, the antenna protection part 160 may also be disposed at the periphery of the antenna hole pattern 212 disposed in the through-hole 211.

Figure 10E:
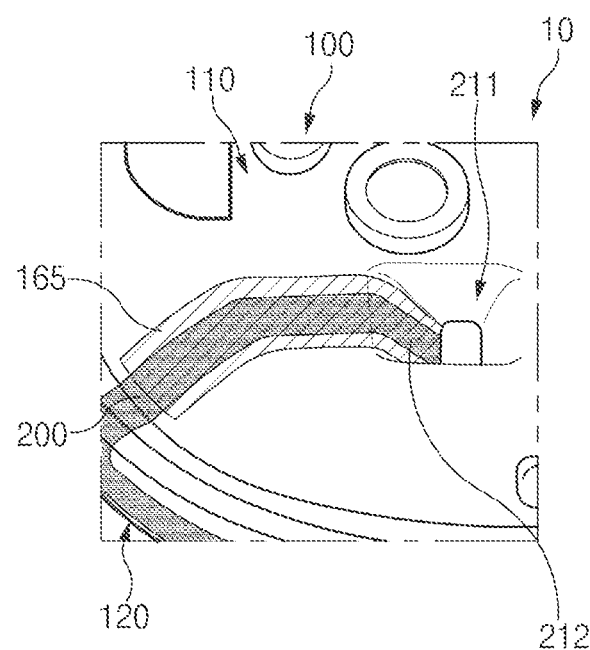
FIG. 10E illustrates an antenna module including a first-type protective layer according to an embodiment of the present disclosure.

FIG. 10E illustrates an antenna module including a first-type protective layer according to an embodiment of the present disclosure.

Referring to FIG. 10E, an antenna module 10 is illustrated, where the antenna module 10 may include a case 100 and an antenna 200 disposed on at least one of a rear part 110 (or the front part, as illustrated in FIG. 1A) or a side part 120 of the case 100.

Additionally or alternatively, the case 300, as illustrated in FIG. 1A, may cover at least a part of the case 100 or at least a part of the antenna 200. At least one through-hole 211 that passes through inner and outer surfaces of the case 100 may be disposed in one side of the case 100. The antenna 200 may be disposed on one side of each of the side part 120 and the rear part 110. A part of the antenna 200 may extend to a certain area of the through-hole 211, and may extend to the front part 130 through the through-hole 211.

According to various embodiments of the present disclosure, the antenna module 10 may include a protective layer 165 as the antenna protection part 160, as illustrated in FIG. 1A. The protective layer 165 may cover the entirety or at least a part of the antenna 200 disposed on at least one of the rear part 110 (or the front part 130) or the side part 120. According to an embodiment of the present disclosure, the protective layer 165 may be disposed on at least a part of an area of the antenna 200 in-molded by the case 300. The protective layer 165 may be, for example, a film. Alternatively, the protective layer 165 may be a coating layer.

Further, the protective layer 165 may be made of at least one of various conductive materials capable of preventing the antenna 200 from being deformed or damaged during a process of injection and forming of the injection fluid of the second case. For example, the material of the protective layer 165 may be polymeric resin. The material of the protective layer 165 may be rubber or acryl. Alternatively, the material of the protective layer 165 may be glass. According to various embodiments of the present disclosure, the protective layer 165 may cover at least a part of an antenna hole pattern 212 disposed in the through-hole 211. The protective layer 165 may be an insulating tape having an adhesive layer disposed on one surface thereof (e.g., the surface contacting the case 100). According to various embodiments of the present disclosure, the protective layer 165 may be formed by applying a liquid material for forming the protective layer 165 to at least a part of an area of the antenna 200 of the case 100 or by dipping the area of the antenna 200 of the case 100 into the liquid material.

Figure 10F:
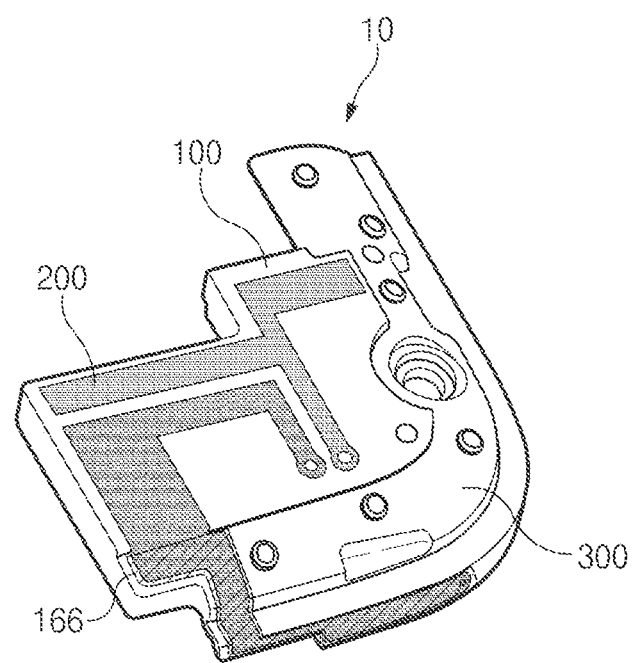
FIG. 10F illustrates an antenna module including a second-type protective layer according to an embodiment of the present disclosure.

FIG. 10F illustrates an antenna module including a second-type protective layer according to an embodiment of the present disclosure.

Referring to FIG. 10F, an antenna module 10 is illustrated, where the antenna module 10 may include a case 100 and an antenna 200 disposed on the case 100. As described above, the antenna 200 may be disposed on at least one of the front part 130, as illustrated in FIG. 1A, the rear part 110, as illustrated in FIG. 1A, or the side part 120, as illustrated in FIG. 1A, of the case 100.

According to various embodiments of the present disclosure, the antenna module 10 may include a protective layer 166. The protective layer 166 may be disposed on an area of the antenna 200 in-molded by a case 300. The protective layer 166 may be, for example, a thin film formed to a certain thickness through a deposition process. The protective layer 166 may be formed on the area of the antenna 200 in-molded by the case 300, using a nonconductive material.

According to an embodiment of the present disclosure, the protective layer 166 may be made of silicone. The protective layer 166 may be deposited on the case 100 having various curves so that a part of the antenna 200 is not exposed to the outside. The protective layer 166 may be made of a material capable of enduring a high temperature/high pressure of the injection fluid of the second case for at least a certain time.

Furthermore, the protective layer 166 may be maintained or removed when the case 300 is formed after the injection fluid of the second case is injected. For example, the protective layer 166 may endure a high temperature/high pressure of the injection fluid of the second case for a certain time, and then may be burned due to the high temperature/high pressure. In relation to this process, a mold for forming the case 300 may include an outlet for discharging gas generated due to the burning of the protective layer 166. The protective layer 166 may serve to maintain an area of the antenna 200 so that the area of the antenna 200 is not deformed or damaged until the case 300 is formed.

As described above, an antenna module according to various embodiments of the present disclosure may include a first case in which at least one antenna protection part formed differently (or distinguishable) from a case surface is disposed and an antenna having a pattern, at least a part of which is disposed on an adjacent area to the antenna protection part. The antenna module may further include a second case covering the antenna protection part and the antenna of the part of the pattern disposed on the adjacent area.

According to various embodiments of the present disclosure, the antenna may be formed through at least one of dot printing, inkjet printing, SUS disposition, disposition based on a combustible printed circuit board, and metal ink painting.

According to various embodiments of the present disclosure, the first case may be made of a platable material, and the antenna may be formed on at least one surface of the first case through the LDS.

According to various embodiments of the present disclosure, the first case may be made of a non-platable material, and the antenna may be formed on at least one surface of the first case through the DPI technique.

According to various embodiments of the present disclosure, the antenna protection part may include at least one of: at least one rail with a certain length or at least one projection disposed in parallel with at least a part of the antenna; a rib or a rail disposed on an area of the antenna adjacent to a gate through which an injection fluid of the second case is introduced; and a protective rib disposed on an adjacent area to the antenna facing a mold when the second case is formed.

According to various embodiments of the present disclosure, the antenna may include a contact connection part in which a through-hole that passes through front and rear surfaces of the first case or inner and outer sides of a side surface of the first case is disposed, a pattern part connected to the contact connection part, the pattern part having a certain length or volume, and an end part disposed on an end of the pattern part.

According to various embodiments of the present disclosure, the end part may be disposed on the first case, at least a part of the end part being exposed to the outside.

According to various embodiments of the present disclosure, the antenna module may further include a connection through-hole passing through inner and outer parts of the first case at the end part, the connection through-hole electrically connecting the inner and outer parts, and an auxiliary pattern electrically connected to the through-hole, the auxiliary pattern being disposed on a surface facing the surface on which the antenna is disposed.

According to various embodiments of the present disclosure, the contact connection part may include a through-hole having a polygonal cross section or a through-hole having a cross section that varies with a depth of the through-hole.

According to various embodiments of the present disclosure, the antenna module may include an antenna hole pattern disposed on a certain area of the first case which defines (or forms) the through-hole to electrically connect the front and rear surfaces or the inner and outer sides of the side surface of the first case, and an insert pin disposed in the through-hole at a certain area of the first case to electrically connect the front and rear surfaces or the inner and outer sides of the side surface of the first case.

According to various embodiments of the present disclosure, at least a part of the second case may be disposed in an upper part and a lower part of the through-hole to close the through-hole.

According to various embodiments of the present disclosure, the antenna module may further include a conductive elastic body electrically connected to the antenna, and an auxiliary case in which another antenna electrically connected to the conductive elastic body is disposed, the auxiliary case being joined to at least one of the first case or the second case.

According to various embodiments of the present disclosure, the other antenna may be disposed on the auxiliary case so as to be exposed.

According to various embodiments of the present disclosure, since the antenna protection part is disposed on the first case and the antenna is disposed on the adjacent area to the antenna protection part, the antenna may be prevented from being deformed or damaged when at least a part of the antenna is in-molded by the second case. According to various embodiments of the present disclosure, the antenna protection part may be provided after the antenna is formed on the first case.

According to various embodiments of the present disclosure, the antenna protection part may include at least one of a tape, a deposition layer, an insulating layer, or a film disposed to cover at least a part of the antenna.

According to various embodiments of the present disclosure, an antenna module may include a first case in which an antenna is disposed, a protective layer disposed to cover at least a part of the antenna, and a second case disposed to cover at least a part of the antenna on which the protective layer is disposed.

According to various embodiments of the present disclosure, the protective layer may include at least one of a tape, a deposition layer, an insulating layer, or a film covering at least a part of the antenna.

According to various embodiments of the present disclosure, the protective layer may be disposed to cover an antenna hole pattern (at least one of inner and outer surfaces of the first case) formed in a through-hole disposed in the first case.

According to various embodiments of the present disclosure, the protective layer may be made of a material combustible by an injection fluid of the second case related to forming of the second case.

According to various embodiments of the present disclosure, an antenna module may include a first case in which an antenna is disposed, an antenna protection part for protecting at least a part of the antenna, and a second case disposed to cover at least a part of an area on which the antenna protection part is disposed. The antenna protection part may include at least one of at least one projection, rib, protective rib, film, insulating layer, deposition layer or tape.

Figure 11:
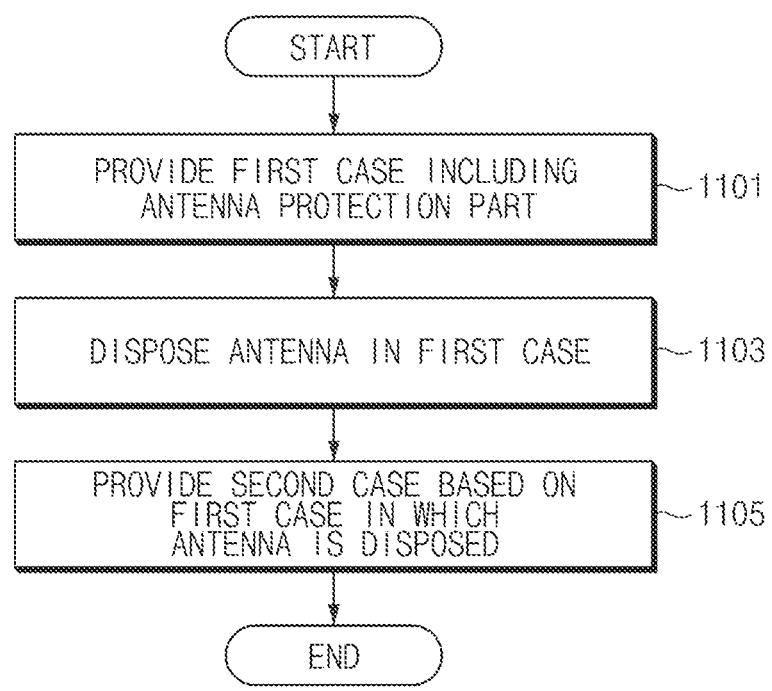
FIG. 11 illustrates an antenna module manufacturing method according to an embodiment of the present disclosure.

FIG. 11 illustrates an antenna module manufacturing method according to an embodiment of the present disclosure.

Referring to FIG. 11, various operations of an antenna module manufacturing method are illustrated, where, for example, the case 100, as illustrated in FIG. 1A, including the antenna protection part 160, as illustrated in FIG. 1A may be provided in operation 1101.

At least a part of the antenna protection part 160 may be disposed on an adjacent area to the antenna 200, as illustrated in FIG. 1A, to be disposed on the case 100. According to various embodiments of the present disclosure, the antenna protection part 160 may be disposed at the periphery of the antenna 200 in-molded by the case 300, as illustrated in FIG. 1A, among the antenna 200. In relation to preparation of the case 100, a first mold in which a pattern corresponding to the antenna protection part 160 is disposed may be provided.

The first mold may include an upper plate and a lower plate. The first mold may have a pattern including the rear part, the front part, and the side part of the case 100. The first mold may have a shape in which at least one of the antenna protection part 160, the rail 162, as illustrated in FIG. 3, the rib 161, as illustrated in FIG. 2, or the protective rib 112, as illustrated in FIG. 4, is disposed. When the first mold is prepared, the injection fluid of the first case made of a platable plastic material may be provided. When the first mold is disposed, the injection fluid of the first case may be injected thereinto and may be cooled, and then the case 100 may be injection molded.

The antenna 200 may be disposed on the case 100 in operation 1103. In relation to this operation, laser patterning may be performed on a designated area of the case 100. Accordingly, a plating pattern may be disposed on at least one of the rear part 110, as illustrated in FIG. 1A, the front part 130, as illustrated in FIG. 1A, or the side part 120, as illustrated in FIG. 1A, of the case 100. When the plating pattern (or printing pattern) is disposed, the antenna 200 (or an antenna pattern or an antenna radiator) may be formed using a conductive material. The plating pattern may be plated or printed with the antenna 200. During a process of disposing the antenna 200, an antenna pattern may be formed in at least one through-hole that passes through the rear part 110 and the front part 130 or inner and outer sides of the side part 120.

In operation 1105, the case 300 may be provided based on the case 100 in which the antenna 200 is disposed. In this operation, the case 300 may be such provided that at least a part of the case 100 is exposed to the outside. The case 300 may be provided so that at least a part of the antenna 200 is in-molded. To this end, the case 300 may be formed by disposing the case 100 in a second mold and injecting the injection fluid of the second case thereinto.

A material of the injection fluid of the second case may be the same as or different from that of the injection fluid of the first case. For example, the material of the injection fluid of the second case may be a non-platable plastic material. The material of the injection fluid of the second case may be, for example, a nonconductive material. The injection fluid of the second case may pass the antenna protection part 160 while being injected into the second mold and disposed on a part of an area of the case 100. Here, the pressure of the injection fluid of the second case is reduced by the antenna protection part 160, so that the antenna 200 may be prevented from being deformed or damaged.

According to various embodiments of the present disclosure, when the case 300 in which at least a part of the antenna 200 is in-molded is prepared, a process of inspecting the frequency characteristic of the 200 and a process of modifying the resonance characteristic of the antenna 200 through comparison with a designated frequency characteristic may be further performed. In relation to the modification of the resonance characteristic of the antenna 200, at least a part of at least one antenna area disposed on the case 100 so as not to be covered by the case 300, for example, the end part 230, may be removed or extended. In general, in the case where a metal plate such as a metal case is disposed around an antenna radiator, the performance of an antenna may be degraded.

Therefore, while elements of an electronic device are arranged in a case, in order to secure a frequency characteristic for operating a communication module, the modification of the resonance characteristic of the antenna 200 may be easily performed by adjusting the end part 230 of the antenna. Based on this process, the antenna module 10 may enable adjustment or improvement in the performance of various antennas for third generation mobile communications (3G), long term evolution (LTE), Wi-Fi, GPS, Bluetooth, near field communication (NFC) or infrared data association (IrDA) communication of a communication device such as a smartphone.

In various embodiments of the present disclosure, an antenna may be designed as a switchable or tunable antenna to obtain optimal performance. For example, the antenna (or an antenna pattern or an antenna radiator) may be configured together with a tuner or a switch. For example, the tuner may be implemented in the form of a tunable capacitor chip. In various embodiments of the present disclosure, the tuner may adjust an RF response so that the RF response corresponds to various bands received by an electronic device.

In addition, the tuner may perform a tuning operation so that the antenna properly operates even when an environment is changed, for example, when a human body or a conductor contacts or approaches the antenna. The antenna may be designed to have a meandered structure or a curved structure. In various embodiments of the present disclosure, the antenna may have at least one branch to receive signals of two or more frequency bands (e.g., wideband code division multiple access (WCDMA), LTE, Wi-Fi and/or GPS). In various embodiments of the present disclosure, the antenna may be manufactured through a LDS process, a double injection process, or a process for forming an FPCB structure, a SUS structure or a metal ink painting structure.

As described above, the antenna module manufacturing method according to an embodiment of the present disclosure may include providing a first case including an antenna protection part, forming an antenna (or an antenna pattern or an antenna radiator) on the first case, and forming a second case on at least a part of the first case on which the antenna is formed.

According to various embodiments of the present disclosure, an antenna module manufacturing method may include forming an antenna in a first case and forming a second case so that at least a part of the antenna of the first case is exposed. Here, the second case may be formed so that end parts of the antenna of the first case are selectively exposed.

According to various embodiments of the present disclosure, the antenna module manufacturing method may include forming a pattern or a pattern part (e.g., an auxiliary pattern or a front pattern part) on an opposing surface to the case on which the antenna is formed (e.g., the front part of the case or the inside of the side part of the case), the pattern or the pattern part being electrically connected to a through-hole disposed in the first case.

According to various embodiments of the present disclosure, the antenna module manufacturing method may include electrically connecting at least a part of the antenna to the pattern or the pattern part through the through-hole formed in the first case.

According to various embodiments of the present disclosure, the claims of the present disclosure may include a mold related to preparation of a frame of the above-mentioned antenna module or an electronic device including the antenna module. For example, the mold may include a first mold related to preparation of the first case and a second mold related to preparation of the second case. A pattern for forming an antenna protection part may be formed on at least a part of an area of the first mold. A pattern for forming a polygonal through-hole may be formed on at least a part of an area of the first mold. A pattern for forming a through-hole of which a cross section is gradually changed towards a center portion thereof may be formed on at least a part of an area of the first mold. A pattern for forming at least one through-hole that electrically connects inner and outer sides of a case may be formed on at least a part of an area of the first mold. The first mold may include a pattern for disposing an insert pin in a through-hole.

According to various embodiments of the present disclosure, the second mold may include a pattern in which a direct contact on at least a part of an area of the antenna of the first case does not occur due to the antenna protection part. The second mold may include a pattern in which the injection fluid of the second case is introduced into a partial space of an upper part of the through-hole and a partial space of a lower part of the through-hole. The second mold may include a pattern in which the second case is disposed on at least a part of the antenna (e.g., the end part) disposed on the first case. The second mold may include a pattern in which the introduced injection fluid of the second case flows onto the antenna via the antenna protection part of the first case.

Figure 12:
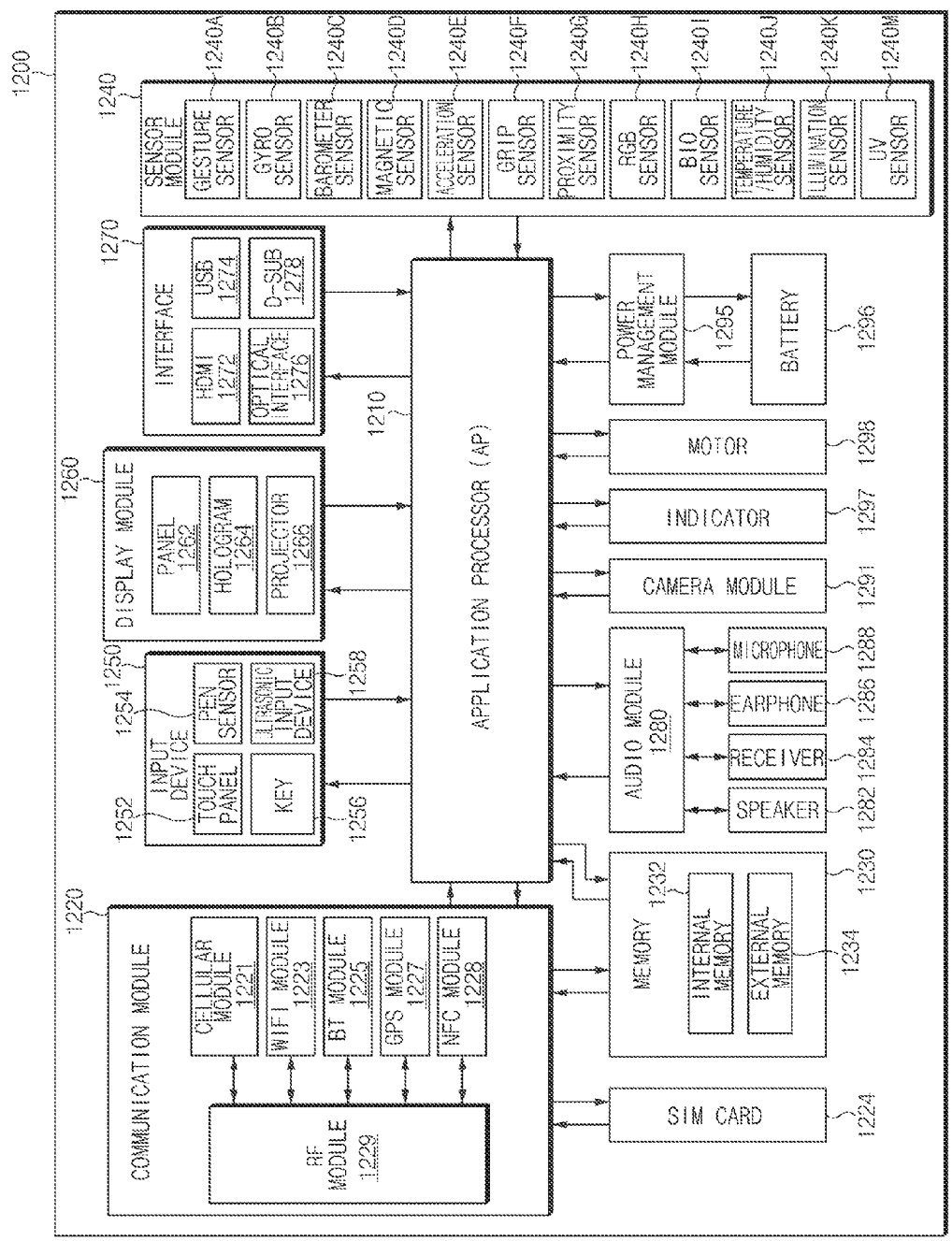
FIG. 12 is a block diagram illustrating a hardware structure of an electronic device according to an embodiment of the present disclosure.

FIG. 12 is a block diagram illustrating a hardware structure of an electronic device according to an embodiment of the present disclosure.

Referring to FIG. 12, an electronic device 1200 may include at least one of at least one application processor (AP) 1210, a communication module 1220, a subscriber identification module (SIM) card 1224, a memory 1230, a sensor module 1240, an input device 1250, a display module 1260, an interface 1270, an audio module 1280, a camera module 1291, a power management module 1295, a battery 1296, an indicator 1297, and/or a motor 1298.

The AP 1210 may run an operating system or an application program so as to control a plurality of hardware or software elements connected to the AP 1210, and may process various data including multimedia data and may perform an operation thereon. The AP 1210 may be implemented with, for example, a system on chip (SoC). According to an embodiment of the present disclosure, the AP 1210 may further include a graphic processing unit (GPU, not illustrated).

The communication module 1220 may perform data transmission/reception for communication between the electronic device 1200 and other electronic devices connected thereto through a network. According to an embodiment of the present disclosure, the communication module 1220 may include a cellular module 1221, a Wi-Fi module 1223, a BT module 1225, a GPS module 1227, an NFC module 1228, and a radio frequency (RF) module 1229.

The cellular module 1221 may provide a voice call service, a video call service, a text message service, or an Internet service through a telecommunications network (e.g., LTE, long term evolution advanced (LTE-A), code division multiple access (CDMA), WCDMA, universal mobile telecommunications system (UMTS), wireless broadband (WiBro) and/or global system for mobile communications (GSM) network). Furthermore, the cellular module 1221 may identify and authenticate electronic devices in the telecommunications network using, for example, a SIM (e.g., the SIM card 1224). According to an embodiment of the present disclosure, the cellular module 1221 may perform at least a part of functions provided by the AP 1210. For example, the cellular module 1221 may perform at least a part of a multimedia control function.

According to an embodiment of the present disclosure, the cellular module 1221 may include a communication processor (CP). The cellular module 1221 may be implemented with, for example, an SoC. Although FIG. 12 illustrates that the cellular module 1221 (e.g., a CP), the memory 1230 and the power management module 1295 are separated from the AP 1210, the AP 1210 may include at least a part of the foregoing elements (e.g., the cellular module 1221), according to an embodiment of the present disclosure.

According to an embodiment of the present disclosure, the AP 1210 or the cellular module 1221 (e.g., a CP) may load, on a volatile memory, a command or data received from at least one of a nonvolatile memory or other elements connected to the AP 1210 or the cellular module 1221, so as to process the command or data. Furthermore, the AP 1210 or the cellular module 1221 may store, in the nonvolatile memory, data received from or generated by at least one of the other elements.

Each of the Wi-Fi module 1223, the BT module 1225, the GPS module 1227 and the NFC module 1228 may include, for example, a processor for processing data transmitted/received through the modules. FIG. 12 illustrates that the cellular module 1221, the Wi-Fi module 1223, the BT module 1225, the GPS module 1227, and the NFC module 1228 are separate blocks. However, according to an embodiment of the present disclosure, at least a part (e.g., two or more) of the cellular module 1221, the Wi-Fi module 1223, the BT module 1225, the GPS module 1227, and the NFC module 1228 may be included in a single integrated chip (IC) or IC package. For example, at least a part of processors corresponding to the cellular module 1221, the Wi-Fi module 1223, the BT module 1225, the GPS module 1227 and the NFC module 1228 respectively (e.g., a communication processor corresponding to the cellular module 1221 and a Wi-Fi processor corresponding to the Wi-Fi module 1223) may be implemented with a single SoC.

The RF module 1229 may transmit/receive data, for example, may transmit/receive RF signals. Although not illustrated, for example, a transceiver, a power amp module (PAM), a frequency filter or a low noise amplifier (LNA) may be included in the RF module 1229. Furthermore, the RF module 1229 may further include a component such as a conductor or a wire for transmitting/receiving free-space electromagnetic waves in a wireless communication system. FIG. 12 illustrates that the cellular module 1221, the Wi-Fi module 1223, the BT module 1225, the GPS module 1227, and the NFC module 1228 share the single RF module 1229. However, according to an embodiment of the present disclosure, at least one of the cellular module 1221, the Wi-Fi module 1223, the BT module 1225, the GPS module 1227, or the NFC module 1228 may transmit/receive RF signals through an additional RF module.

According to various embodiments of the present disclosure, the RF module 1229 may include at least one antenna module 10. For example, the antenna module 10 may include an antenna having a frequency characteristic for supporting the cellular module 1221. According to various embodiments of the present disclosure, the antenna module 10 may include at least one antenna having a frequency characteristic for supporting at least one of the WiFi module 1223, the BT module 1225, the GPS module 1227, or the NFC module 1228. The antenna module 10 may include at least one of the antenna modules described above with reference to FIGS. 1A to 11. For example, the antenna module 10 may be disposed on the case 100, and at least a part of the antenna module 10 may be in-molded by the case 300. At least a part of the antenna 200 of the antenna module 10 may be exposed to the outside on the case 100. A through-hole included in the antenna 200 disposed in the antenna module 10 may pass through and electrically connect inner and outer surfaces of a case. Here, an upper part and a lower part of the through-hole may be filled with a part of the case 300. Alternatively, an insert pin may be inserted into the through hole.

According to various embodiments of the present disclosure, at least a part of the antenna 200 exposed to the outside, for example, the end part 230, may be removed or extended in relation to adjustment of a resonance characteristic during an antenna tuning process. Additionally or alternatively, at least a part of an auxiliary pattern may be connected to the antenna 200 so as to be disposed on an inner surface (a surface exposed to the outside) of the case 100 or an additional auxiliary case. As described above with respect to the end part 230, at least a part of the auxiliary pattern may be removed or extended in relation to adjustment of a resonance characteristic of an antenna.

The SIM card 1224 may include a subscriber identification module, and may be inserted into a slot formed at a specific location of the electronic device. The SIM card 1224 may include unique identification information (e.g., an integrated circuit card identifier (ICCID)) or subscriber information (e.g., international mobile subscriber identity (IMSI)).

The memory 1230 may include an internal memory 1232 and/or an external memory 1234. The internal memory 1232 may include at least one of a volatile memory (e.g., a dynamic random access memory (DRAM), a static RAM (SRAM) or a synchronous dynamic RAM (SDRAM)) and/or a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory).

According to an embodiment of the present disclosure, the internal memory 1232 may be a solid state drive (SSD). The external memory 1234 may include a flash drive, for example, compact flash (CF), secure digital (SD), micro secure digital (Micro-SD), mini secure digital (Mini-SD), extreme digital (xD) or a memory stick. The external memory 1234 may be functionally connected to the electronic device 1200 through various interfaces. According to an embodiment of the present disclosure, the electronic device 1200 may further include a storage device (or a storage medium) such as a hard drive.

The sensor module 1240 may measure physical quantity or detect an operation state of the electronic device 1200 so as to convert measured or detected information into an electrical signal. The sensor module 1240 may include, for example, at least one of a gesture sensor 1240A, a gyro sensor 1240B, a barometric pressure sensor 1240C, a magnetic sensor 1240D, an acceleration sensor 1240E, a grip sensor 1240F, a proximity sensor 1240G, a color sensor 1240H (e.g., a red/green/blue (RGB) sensor), a biometric (bio) sensor 1240I, a temperature/humidity sensor 1240J, an illumination sensor 1240K, and/or an ultraviolet (UV) sensor 1240M. Additionally or alternatively, the sensor module 1240 may include, for example, (not shown) an olfactory sensor (E-nose sensor), an electromyography (EMG) sensor, an electroencephalogram (EEG) sensor, an electrocardiogram (ECG) sensor, a photoplethysmography (PPG) sensor, an infrared (IR) sensor, an iris recognition sensor, or a fingerprint sensor. The sensor module 1240 may further include a control circuit for controlling at least one sensor included therein.

The input device 1250 may include a touch panel 1252, a (digital) pen sensor 1254, a key 1256, or an ultrasonic input device 1258. The touch panel 1252 may recognize a touch input using at least one of capacitive, resistive, infrared, and ultraviolet sensing methods. The touch panel 1252 may further include a control circuit. In a case of using the capacitive sensing method, a physical contact recognition or proximity recognition is allowed. The touch panel 1252 may further include a tactile layer. In this case, the touch panel 1252 may provide tactile reaction to a user.

The (digital) pen sensor 1254 may be implemented in a similar or same manner as the method of receiving a touch input of a user or may be implemented using an additional sheet for recognition. The key 1256 may include, for example, a physical button, an optical button, or a keypad. The ultrasonic input device 1258, which is an input device for generating an ultrasonic signal, may enable the electronic device 1200 to sense a sound wave through a microphone (e.g., a microphone 1288) so as to identify data, wherein the ultrasonic input device 1258 is capable of wireless recognition. According to an embodiment of the present disclosure, the electronic device 1200 may use the communication module 1220 so as to receive a user input from an external device (e.g., a computer or server) connected to the communication module 1220.

The display module 1260 may include a panel 1262, a hologram device 1264, and/or a projector 1266. The panel 1262 may be, for example, a liquid crystal display (LCD) or an active-matrix organic light-emitting diode (AM-OLED). The panel 1262 may be, for example, flexible, transparent or wearable. The panel 1262 and the touch panel 1252 may be integrated into a single module. The hologram device 1264 may display a stereoscopic image in a space using a light interference phenomenon. The projector 1266 may project light onto a screen so as to display an image. The screen may be disposed in the inside or the outside of the electronic device 1200. According to an embodiment of the present disclosure, the display module 1260 may further include a control circuit for controlling the panel 1262, the hologram device 1264, or the projector 1266.

The interface 1270 may include, for example, a high definition multimedia interface (HDMI) 1272, a universal serial bus (USB) 1274, an optical interface 1276, and/or a D-subminiature (D-sub) 1278. Additionally or alternatively, the interface 1270 may include, for example, a mobile high-definition link (MHL) interface, a SD card/multi-media card (MMC) interface, or an IrDA interface.

The audio module 1280 may convert a sound into an electrical signal or vice versa. The audio module 1280 may process sound information input or output through a speaker 1282, a receiver 1284, an earphone 1286, and/or the microphone 1288.

According to an embodiment of the present disclosure, the camera module 1291 for shooting a still image or a video may include at least one image sensor (e.g., a front sensor or a rear sensor), a lens (not illustrated), an image signal processor (ISP, not illustrated), or a flash (e.g., an LED or a xenon lamp, not illustrated).

The power management module 1295 may manage power of the electronic device 1200. Although not illustrated, a power management integrated circuit (PMIC), a charger integrated circuit (IC), or a battery or fuel gauge may be included in the power management module 1295.

The PMIC may be mounted on an integrated circuit or an SoC semiconductor. A charging method may be classified into a wired charging method and a wireless charging method. The charger IC may charge a battery, and may prevent an overvoltage or an overcurrent from being introduced from a charger. According to an embodiment of the present disclosure, the charger IC may include a charger IC for at least one of the wired charging method and the wireless charging method. The wireless charging method may include, for example, a magnetic resonance method, a magnetic induction method or an electromagnetic method, and may include an additional circuit, for example, a coil loop, a resonant circuit, or a rectifier.

The battery gauge may measure, for example, a remaining capacity of the battery 1296 and a voltage, current or temperature thereof while the battery is charged. The battery 1296 may store or generate electricity, and may supply power to the electronic device 1200 using the stored or generated electricity. The battery 1296 may include, for example, a rechargeable battery or a solar battery.

The indicator 1297 may indicate a specific state of the electronic device 1200 or a part thereof (e.g., the AP 1210), such as a booting state, a message state, or a charging state. The motor 1298 may convert an electrical signal into a mechanical vibration. Although not illustrated, a processing device (e.g., a GPU) for supporting a mobile TV may be included in the electronic device 1200. The processing device for supporting a mobile TV may process media data according to the standards of digital multimedia broadcasting (DMB), digital video broadcasting (DVB) or media flow.

The above-mentioned electronic device may include an antenna module. The electronic device according to an embodiment of the present disclosure may include an antenna protection part (e.g., a projection, a rail, a rib, a protective rib, or the like) for guiding or protecting an antenna disposed on a case. At least a part of the antenna may be in-molded by another case, for example, a second case.

The electronic device according to an embodiment of the present disclosure may include an antenna module including a first case in which at least one antenna protection part formed differently (or distinguishable) from a case surface is disposed and an antenna having a pattern, at least a part of which is disposed on an adjacent area to the antenna protection part, and a frame in which at least one antenna module is disposed. The electronic device may further include a second case covering the antenna protection part and the antenna of the part of the pattern disposed on the adjacent area.

According to various embodiments of the present disclosure, the antenna protection part may include at least one of: at least one rail with a certain length or at least one projection disposed in parallel with at least a part of the antenna; a rib or a rail disposed on an area of the antenna adjacent to a gate through which an injection fluid of the second case is introduced; and a protective rib disposed on an adjacent area to the antenna facing a mold when the second case is formed.

According to various embodiments of the present disclosure, the first case may be made of a platable plastic material, and the antenna may be formed on at least one surface of the first case through the LDS.

According to various embodiments of the present disclosure, the first case may be made of a non-platable material, and the antenna may be formed on at least one surface of the first case through the DPI technique.

According to various embodiments of the present disclosure, at least a part of the antenna may be disposed on the first case so as to be exposed to the outside.

According to various embodiments of the present disclosure, the antenna may further include at least one of a through-hole passing through inner and outer sides of the first case, the through-hole electrically connecting the inner and outer sides, or an auxiliary pattern electrically connected to the through-hole, the auxiliary pattern being disposed on a surface facing the surface on which the antenna is disposed.

According to various embodiments of the present disclosure, the antenna may further include a through-hole passing through inner and outer sides of the first case, the through-hole electrically connecting the inner and outer sides, the through-hole having a polygonal cross section or a cross section that varies with a depth of the through-hole, and an insert pin closing the through-hole or the second case disposed in an upper part and a lower part of the through-hole According to various embodiments of the present disclosure, in the electronic device, a through-hole that passes through and electrically connects front and rear surfaces of a first case of an antenna module may be disposed as at least a partial element of an antenna, and the through-hole may be closed by a second case or an additional insert pin so as to support a waterproofing or dust proofing function.

According to various embodiments of the present disclosure, the antenna module of the electronic device may further include a conductive elastic body electrically connected to the antenna, and an auxiliary case in which another antenna electrically connected to the conductive elastic body and exposed to the outside is disposed, the auxiliary case being joined to at least one of the first case or the second case.

According to various embodiments of the present disclosure, at least a part of the antenna of the electronic device may be disposed so as to be exposed between double injection molded cases. For example, the electronic device may include at least one of an auxiliary pattern, a front pattern part, or a side pattern part disposed on an area (e.g., an inner side of a side part of a case or an inner side of a rear part (front part) of the case) connected to an end part of the antenna or a specific location of the antenna through a connection through-hole and not covered by a case during a double injection molding process. Here, the first case may be plated or printed with at least one of the end part, the auxiliary pattern, the front pattern part, or the side pattern part through the LDS so that at least a part thereof may be removed or extended when necessary (e.g., adjustment of a frequency characteristic of an antenna).

According to various embodiments of the present disclosure, the antenna included in the electronic device may be formed through at least one of dot printing, inkjet printing, SUS disposition, or disposition based on a combustible printed circuit board.

Figure 13:
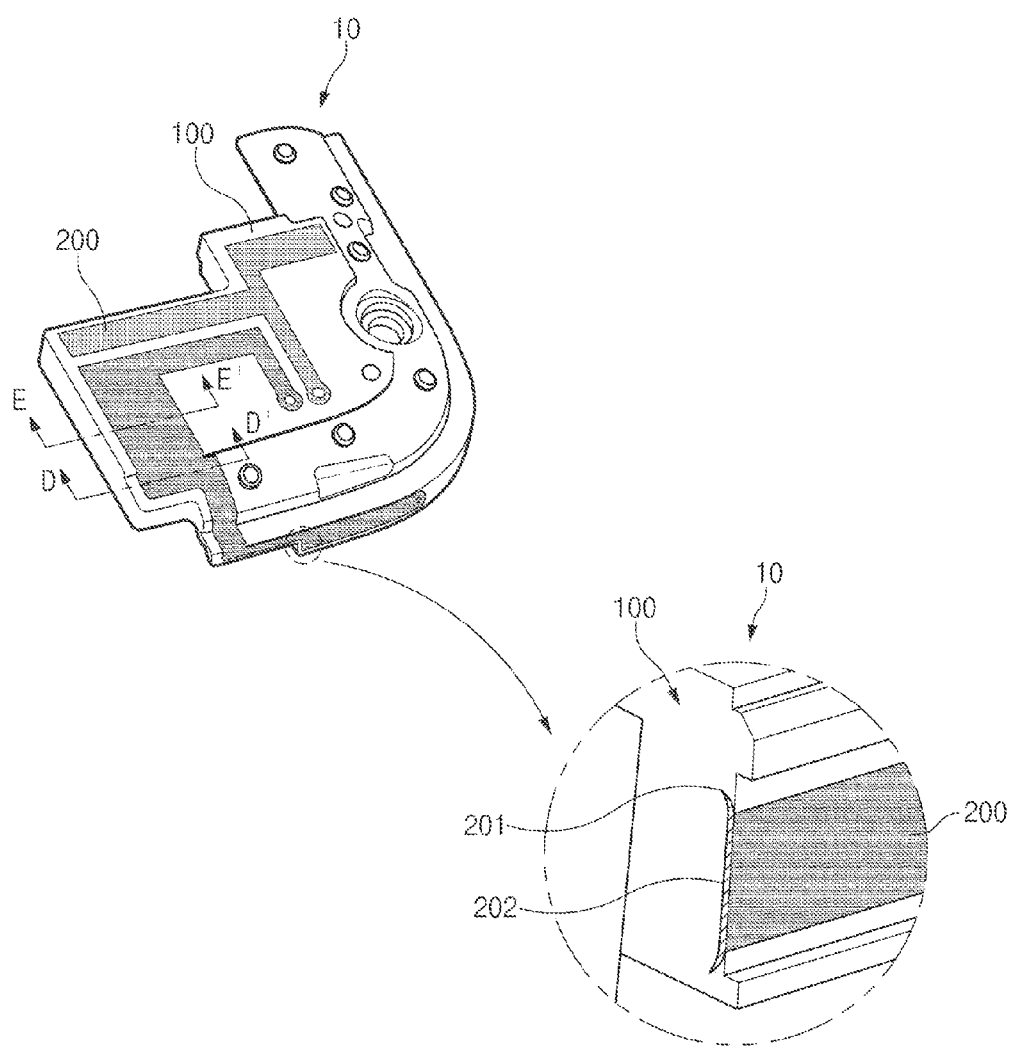
FIG. 13 illustrates an antenna module according to an embodiment of the present disclosure.

FIG. 13 illustrates an antenna module according to an embodiment of the present disclosure.

Referring to FIG. 13, an antenna module 10 is illustrated, where the antenna module 10 may include a case 100 and an antenna 200. Additionally or alternatively, the antenna module 10 may further include the case 300, as illustrated in FIG. 1A, covering at least a part of the case 100 or at least a part of the antenna 200.

The case 100 may be a part of a frame of an electronic device. For example, the case 100 may be a partial structure of the frame of the electronic device in which the antenna 200 is disposed. According to various embodiments of the present disclosure, the case 100 may be formed as an additional separate structure (e.g., a carrier) so as to be joined to the frame of the electronic device. Alternatively, the case 100 may be formed when the frame of the electronic device is injection molded.

The antenna 200 may be disposed on at least one surface of the case 100. The antenna 200 may support signal transmission/reception of at least one communication module disposed in the electronic device. According to an embodiment of the present disclosure, the antenna 200 may include a plurality of patterns to support signal transmission/reception of a plurality of communication modules. Alternatively, the antenna 200 may include one pattern in relation to one communication module. A shape, length or volume of the antenna 200 may be variously designed according to a frequency characteristic of a communication module applied.

According to various embodiments of the present disclosure, the antenna 200 may be formed through plating, printing or painting on one surface of the case 100. Alternatively, the antenna 200 may be formed in a certain pattern, and then may be attached or fixed to at least one surface of the case 100.

As illustrated in FIG. 13, the shape of the antenna 200 may be formed or disposed on one engraved surface of the case 100. Accordingly, the antenna 200 may include a pattern body 202 and a pattern projection 201 according to a shape of the one engraved surface. The pattern body 202 may have a width, area or volume corresponding to a frequency characteristic. The pattern projection 201 may protrude towards the inside of the case 100 at one side of the pattern body, for example, at an edge thereof. The pattern body 202 and the pattern projection 201 may be formed on at least a part of the antenna 200. The pattern projection 201 may be formed in the shape of a rail in a longitudinal direction of the antenna 200. Alternatively, the pattern projection 201 may be a plurality of projections protruding from a rear surface of the pattern body 202 at various locations of the pattern body 202, the projections having a certain height. For example, the pattern projection 201 may have the shape of a plurality of embossed parts (or an uneven shape) protruding from the pattern body 202.

According to an embodiment of the present disclosure, the pattern projection 201 may be formed in a direction towards a front surface of the pattern body 202. The pattern projection 201 may be inclined at a certain angle to the front surface of the pattern body 202. The pattern projection 201 may be formed on an edge of the pattern body 202. The pattern projection 201 may support the antenna 200 so that the antenna 200 is more securely placed on the case 100. Accordingly, the antenna 200 may have a resistance to deformation or damage by the injection fluid of the second case during a process of forming the case 300. Furthermore, since the pattern projection 201 is formed inside the case 100, the antenna 200 may not be floated from a surface of the case 100.

Figure 14:
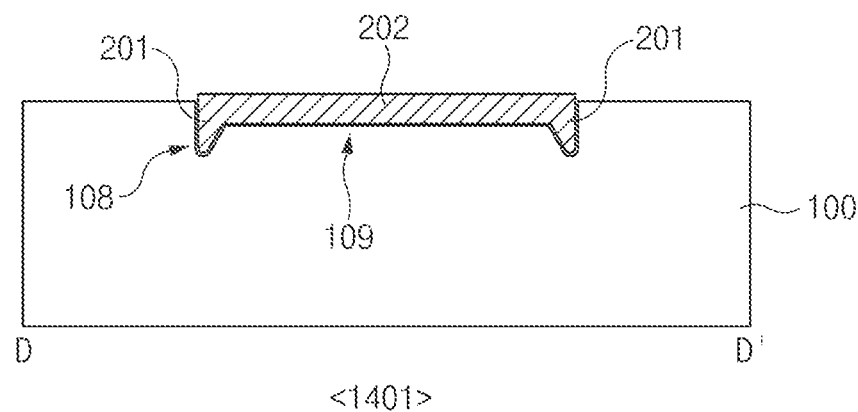
FIG. 14 illustrates a cross section of an antenna module according to an embodiment of the present disclosure.
Figure 14:
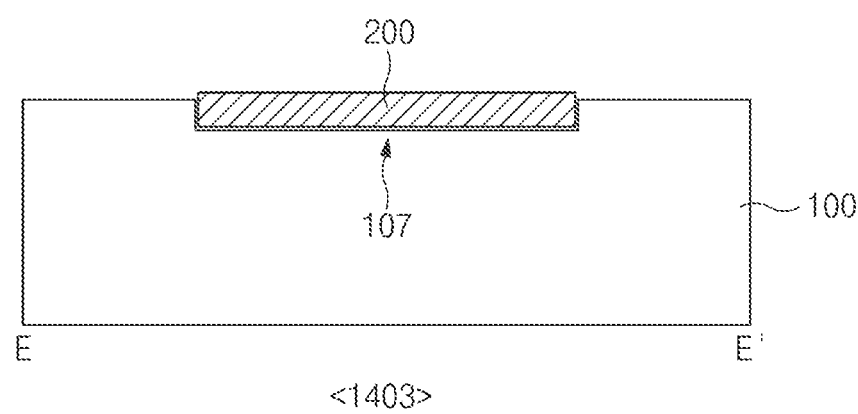

FIG. 14 illustrates a cross section of an antenna module according to an embodiment of the present disclosure.

Referring to FIG. 14, a case 100 is illustrated, such that, as illustrated in item 1401 showing a cross section taken along line D-D' of FIG. 13, at least a part of an antenna 200, as illustrated in FIG. 13, may be formed in a main groove 109 and at least one auxiliary groove 108 disposed in the case 100. At least one auxiliary groove 108 formed in the case 100 may have a larger depth than that of the main groove 109.

According to various embodiments of the present disclosure, the auxiliary groove 108 may have the shape of a multistep. For example, the auxiliary groove 108 may have a single-layer structure in a depth direction. A pattern body 202 of the antenna 200 may be disposed in the main groove 109, and a pattern projection 201 may be disposed in at least one auxiliary groove 108.

In relation to preparation of the above-mentioned 200, during an injection molding process of the case 100, the first mold may be such shaped that a disposition form of the antenna 200 corresponds to that of the main groove 109 and the at least one auxiliary groove 108. According to various embodiments of the present disclosure, after the case 100 is injection molded, during a process of patterning an area of a surface of the case 100 on which the antenna 200 is to be disposed, the main groove 109 and the at least one auxiliary groove 108 may be disposed.

For example, in a case of performing laser patterning, primary laser patterning may be performed to form the main groove 109 in a surface of the case 100. Thereafter, secondary laser patterning may be performed to form the at least one auxiliary groove 108. Alternatively, the laser patterning may be such performed that a relatively deep groove is formed in an area of the surface of the case 100 in which the at least one auxiliary groove 108 is to be disposed, and a relatively shallow groove is formed in an area of the surface of the case 100 in which the main groove 109 is to be disposed. According to various embodiments of the present disclosure, an area in which the main groove 109 and the at least one auxiliary groove 108 are disposed may be an area in which the antenna 200 is in-molded by the case 300.

According to various embodiments of the present disclosure, as illustrated in item 1403 showing a cross section taken along line E-E' of FIG. 13, a part of the antenna 200 may be formed in a pattern groove 107 disposed in the case 100. The pattern groove 107 may have a uniform depth.

According to various embodiments of the present disclosure, in order to prevent the antenna 200 from being floated from the surface of the case 100, areas of the case 100 on which the antenna 200 is to be disposed may have the main groove 109 and the at least one auxiliary groove 108. Accordingly, the antenna 200 formed on at least a part of the surface of the case 100 may include the pattern body 202 and the pattern projection 201.

Figure 15:
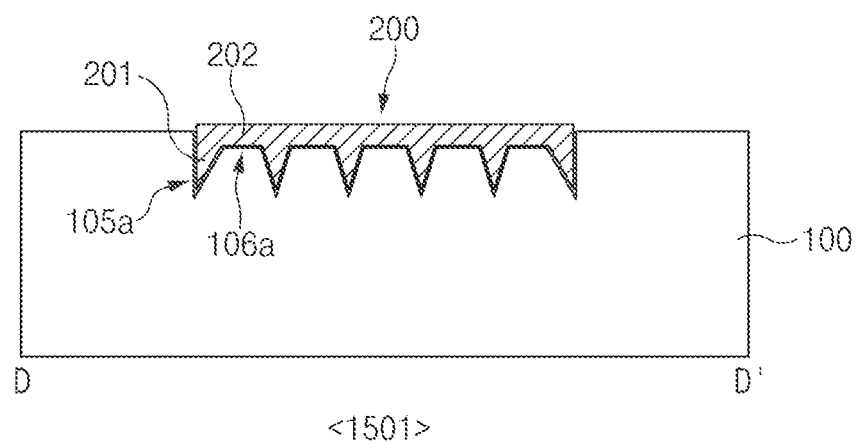
FIG. 15 illustrates antenna shapes according to an embodiment of the present disclosure.
Figure 15:
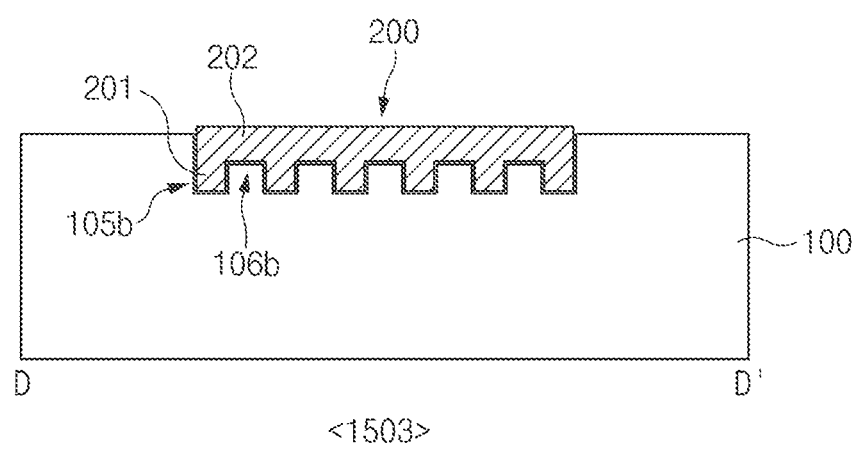

FIG. 15 illustrates antenna shapes according to an embodiment of the present disclosure.

Referring to FIG. 15, a case 100 is illustrated, such that, as illustrated in item 1501 showing a cross section taken along line D-D' of FIG. 13, an antenna 200 may include a pattern body 202 and at least one pattern projection 201. The at least one pattern projection 201 may be disposed in a direction towards (or opposite to) the front surface of the pattern body 202. For example, the pattern projections 201 may be arranged at regular intervals at the rear of the pattern body 202.

The case 100 may include a peak 106a and a valley 105a of a first shape (e.g., a triangle) at a location where the antenna 200 is disposed. To this end, a patterning process may be performed so that the peak 106a and the valley 105a of the first shape are provided in plurality in at least a part of an area of the case 100 in which the antenna 200 is to be disposed. Alternatively, an area of the first mold for injection-molding the case 100, in which the antenna 200 is to be disposed, may have a certain pattern corresponding to the at least one peak 106a and valley 105a.

According to various embodiments of the present disclosure, as illustrated in 1503 showing a cross section taken along line D-D' of FIG. 13, the antenna 200 may include a peak 106b and a valley 105b of a second shape (e.g., a quadrangle). In relation to forming of the peak 106b and the valley 105b of the second shape, a patterning process of the case 100 corresponding to a pattern of the peak 106b and the valley 105b of the second shape may be performed. Alternatively, during a process of preparing the first mold related to injection molding of the case 100, a pattern including the peak 106b and the valley 105b of the second shape in at least a part of an area in which the antenna 200 is to be disposed may be disposed in the first mold.

The pattern body 202 and the pattern projection 201 may be formed over the entirety of the antenna 200 or may be formed on the area in-molded by a case 300, as illustrated in FIG. 1A. Accordingly, even in a pattering process or a mold preparing process, the corresponding pattern may be formed over the entire area in which the antenna 200 is to be disposed or the corresponding pattern may be formed in the area of the antenna 200 in-molded by the case 300.

The pattern projection 201 having various shapes is disposed on the pattern body 202, the antenna 200 may be more securely placed on the case 100, thereby preventing a floating phenomenon. Furthermore, since the pattern projection 201 improves binding strength between the case 100 and the antenna 200 so that the antenna 200 may be prevented from being deformed or damaged by the injection fluid of the second case.

An antenna module according to an embodiment of the present disclosure may include a first case in which a main groove and at least one auxiliary groove are disposed in at least a part of an area thereof, and an antenna, at least a part of which is disposed on the first case in which the main groove and the at least one auxiliary groove are disposed.

According to various embodiments of the present disclosure, the auxiliary groove may be deeper than the main groove.

According to various embodiments of the present disclosure, the antenna module may further include a second case covering the at least a part of the antenna disposed in the main groove and the auxiliary groove.

According to various embodiments of the present disclosure, the at least a part of the antenna may include a pattern body disposed in the main groove and a pattern projection formed in a direction towards a front surface of the pattern body, the pattern projection being disposed in the auxiliary groove.

Each of the above-mentioned elements of the electronic device according to various embodiments of the present disclosure may be configured with at least one component, and the names of the elements may be changed according to the type of the electronic device. The electronic device according to various embodiments of the present disclosure may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

The term "module" used herein may represent, for example, a unit including one or more combinations of hardware, software and firmware. The term "module" may be interchangeably used with the terms "unit," "logic," "logical block," "component" and "circuit." The "module" may be a minimum unit of an integrated component or may be a part thereof. The "module" may be a minimum unit for performing one or more functions or a part thereof. The "module" may be implemented mechanically or electronically. For example, the "module" according to various embodiments of the present disclosure may include at least one of an application-specific integrated circuit (ASIC) chip, a field-programmable gate array (FPGA), or a programmable-logic device for performing some operations, which are known or will be developed.

According to various embodiments of the present disclosure, an antenna module and an electronic device including the same may more surely protect an antenna pattern during a process of manufacturing the electronic device or when used by a user.

According to various embodiments of the present disclosure, an antenna module and an electronic device including the same may facilitate compensation of an antenna pattern during a manufacturing process and may enable waterproofing/dust proofing.

The above embodiments of the present disclosure are illustrative and not limitative. Various alternatives and equivalents are possible. Other additions, subtractions, or modifications are obvious in view of the present disclosure and are intended to fall within the scope of the appended claims.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An antenna module comprising:
a first case including a case surface and at least one antenna protection part, wherein the at least one antenna protection part is disposed on the first case and is formed to be distinguishable from the case surface;
a through-hole passing through inner and outer parts of the first case, the through-hole electrically connecting the inner and outer parts;
an antenna including a pattern;
a second case covering the antenna protection part and the part of the pattern adjacently disposed to the antenna projection part; and
an auxiliary pattern electrically connected to the antenna, wherein at least a part of the pattern of the antenna is adjacently disposed to the antenna protection part,
wherein the auxiliary pattern is disposed on a surface different from the case surface on which the antenna is disposed and the auxiliary pattern is connected to the antenna through the through-hole, and
wherein at least a part of the second case is disposed in an upper part and a lower part of the through-hole to close the through-hole.

2. The antenna module according to claim 1, wherein the antenna protection part comprises at least one of:
at least one rail having a certain length and at least one projection disposed in parallel with at least a part of the antenna;
at least one of a rib and a rail disposed on an area of the antenna adjacent to a gate through which an injection fluid of the second case is introduced; and
a protective rib disposed on an area that is adjacent to the antenna facing a mold when the second case is formed.

3. The antenna module according to claim 1, wherein the antenna comprises:
a contact connection part in which the through-hole is disposed, such that the through-hole passes through front and rear surfaces of the first case or inner and outer sides of a side surface of the first case;
a pattern part connected to the contact connection part, the pattern part having a certain length or volume; and
an end part disposed on an end of the pattern part.

4. The antenna module according to claim 3, wherein the end part is disposed on the first case so as to be exposed to an outside of the first case.

5. The antenna module according to claim 3, wherein the through-hole is having a polygonal cross section or the through-hole is having a cross section that varies with a depth.

6. The antenna module according to claim 3, further comprising:
an antenna hole pattern disposed on a certain area of the first case which forms the through-hole; and
an insert pin disposed in the through-hole.

7. The antenna module according to claim 1, further comprising:
a conductive elastic body electrically connected to the antenna; and
an auxiliary case in which another antenna electrically connected to the conductive elastic body is disposed, the auxiliary case being joined to at least one of the first case and the second case.

8. The antenna module according to claim 7, wherein the auxiliary case exposes the other antenna.

9. The antenna module according to claim 1, wherein the antenna is formed through at least one of dot printing, inkjet printing, direct pattering intenna (DPI), laser direct plating (LDP), steel use stainless (SUS) disposition, and disposition based on a combustible printed circuit board.

10. The antenna module according to claim 1,
wherein the first case is made of a platable material, and the antenna is formed on at least one surface of the first case through laser direct structuring (LDS), or
wherein the first case is made of a non-platable material, and the antenna is formed on at least one surface of the first case through direct pattering intenna (DPI).

11. The antenna module according to claim 1, further comprising a cover disposed adjacent to the second case and covering a portion of the antenna that is not covered by the first case and the second case.

12. An electronic device comprising:
an antenna module comprising:
a first case including a case surface and at least one antenna protection part, wherein at least one antenna protection part is disposed on the first case, and is formed to be distinguishable from the case surface,
a through-hole passing through inner and outer parts of the first case, the through-hole electrically connecting the inner and outer parts,
an antenna including a pattern, at least a part of the pattern of the antenna is adjacently disposed to the antenna protection part, and
a second case covering the antenna protection part and the part of the pattern adjacently disposed to the antenna projection part;
a frame in which the antenna module is disposed; and
an auxiliary pattern electrically connected to the antenna,
wherein the auxiliary pattern is disposed on a surface different from the case surface on which the antenna is disposed,
wherein the auxiliary pattern is connected to the antenna through the through-hole, and
wherein the electronic device further comprises:
a conductive elastic body electrically connected to the antenna, and
an auxiliary case in which another antenna electrically connected to the conductive elastic body and exposed to an outside of the conductive elastic body is disposed, the auxiliary case being joined to at least one of the first case and the second case.

13. The electronic device according to claim 12, wherein the antenna protection part comprises at least one of:
- at least one rail having a certain length and at least one projection disposed in parallel with at least a part of the antenna;
- at least one of a rib and a rail disposed on an area of the antenna adjacent to a gate through which an injection fluid of the second case is introduced; and
- a protective rib disposed on an area that is adjacent to the antenna facing a mold when the second case is formed.

14. The electronic device according to claim 12, wherein the first case is made of a platable plastic material, and the antenna is formed on at least one surface of the first case through laser direct structuring (LDS), or
- wherein the first case is made of a non-platable material, and the antenna is formed on at least one surface of the first case through direct pattering intenna (DPI).

15. The electronic device according to claim 12, wherein at least a part of the antenna is disposed on the first case so as to be exposed to an outside of the first case.

16. The electronic device according to claim 12, wherein the antenna comprises at least one of:
- the through-hole, wherein the through-hole having a polygonal cross section or the through-hole having a cross section that varies with a depth;
- the auxiliary pattern, wherein the auxiliary pattern electrically connected to the through-hole;
- an insert pin closing the through-hole; or
- the second case disposed in an upper part and a lower part of the through-hole.

\* \* \* \* \*